US012300171B2

(12) United States Patent
Yu et al.

(10) Patent No.: US 12,300,171 B2
(45) Date of Patent: May 13, 2025

(54) PIXEL CIRCUIT AND DRIVING METHOD THEREOF, DISPLAY PANEL, AND DISPLAY APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Ziyang Yu, Beijing (CN); Haijun Qiu, Beijing (CN); Ming Hu, Beijing (CN); Zhiliang Jiang, Beijing (CN); Haigang Qing, Beijing (CN); Yunsheng Xiao, Beijing (CN); Tiaomei Zhang, Beijing (CN); Miao Wang, Beijing (CN)

(73) Assignees: CHENGDU BOE OPTOELECTRICS TECHNOLOGY CO., LTD., Sichuan (CN); BOE TECHNOLOGY GROUP CO., LTD., Bejing (CN)

( * ) Notice: Subject to any disclaimer, the term of this patent is extended or adjusted under 35 U.S.C. 154(b) by 0 days.

(21) Appl. No.: 18/251,069

(22) PCT Filed: May 31, 2022

(86) PCT No.: PCT/CN2022/096260
§ 371 (c)(1),
(2) Date: Apr. 28, 2023

(87) PCT Pub. No.: WO2023/230845
PCT Pub. Date: Dec. 7, 2023

(65) Prior Publication Data
US 2024/0331628 A1 Oct. 3, 2024

(51) Int. Cl.
*G09G 3/3233* (2016.01)

(52) U.S. Cl.
CPC ..... *G09G 3/3233* (2013.01); *G09G 2310/061* (2013.01); *G09G 2310/08* (2013.01); *G09G 2320/0247* (2013.01)

(58) Field of Classification Search
CPC ............. G09G 2310/08; G09G 3/3233; G09G 2310/061; G09G 2320/0247
See application file for complete search history.

(56) References Cited

U.S. PATENT DOCUMENTS 11,361,713 B1 6/2022 Fu
2015/0199932 A1 7/2015 Ohara et al.
(Continued)

FOREIGN PATENT DOCUMENTS

CN 104050918 A 9/2014
CN 111341245 A 6/2020
(Continued)

OTHER PUBLICATIONS

Extended European Search Report for corresponding EP Application No. 22944182.9, dated Oct. 28, 2024, 11 pages.

*Primary Examiner* — Muhammad N Edun
(74) *Attorney, Agent, or Firm* — Dority & Manning, P.A.

(57) ABSTRACT

A pixel circuit includes a data writing sub-circuit, a driving sub-circuit, and one or more potential maintenance sub-circuits. The data writing sub-circuit is coupled to at least a first voltage signal terminal, a data signal terminal, a first scan signal terminal and a first node, and writes a data signal provided by the data signal terminal into the first node under control of at least a first scan signal provided by the first scan signal terminal. The driving sub-circuit is coupled to the first node, a second node and a third node, and creates a path between the second node and the third node under control of a potential at the first node. A potential maintenance sub-circuit is coupled to a circuit node and a reference signal (Continued)

terminal, and maintains a potential at the circuit node through a reference signal provided by the reference signal terminal.

19 Claims, 19 Drawing Sheets

(56) References Cited

U.S. PATENT DOCUMENTS

| | | | | |
|---|---|---|---|---|
| 2021/0407419 | A1* | 12/2021 | Li | G09G 3/3258 |
| 2022/0051633 | A1 | 2/2022 | Li et al. | |
| 2022/0148508 | A1 | 5/2022 | Chi | |
| 2022/0165214 | A1 | 5/2022 | Liu et al. | |
| 2022/0180810 | A1* | 6/2022 | Zhang | G09G 3/3241 |
| 2022/0277693 | A1 | 9/2022 | Chen et al. | |
| 2022/0343823 | A1 | 10/2022 | Wang et al. | |

FOREIGN PATENT DOCUMENTS

| | | | |
|---|---|---|---|
| CN | 112116893 | A | 12/2020 |
| CN | 113314073 | A | 8/2021 |
| KR | 20180078933 | A | 7/2018 |

* cited by examiner

PIXEL CIRCUIT AND DRIVING METHOD THEREOF, DISPLAY PANEL, AND DISPLAY APPARATUS

CROSS-REFERENCE TO RELATED APPLICATION

This application is a national phase entry under 35 USC 371 of International Patent Application No. PCT/CN2022/096260, filed on May 31, 2022, which is incorporated herein by reference in its entirety.

TECHNICAL FIELD

The present disclosure relates to the field of display technologies, and in particular, to a pixel circuit and a driving method thereof, a display panel and a display apparatus.

BACKGROUND

Different application scenarios have different requirements for a refresh frequency of a display apparatus. For example, a refresh frequency required when a static image is displayed is lower than a refresh frequency required when a dynamic image is displayed. In order to adapt to different application scenarios, display apparatuses with different refresh frequencies and display apparatuses with adjustable refresh frequencies are introduced in the market.

SUMMARY

In an aspect, a pixel circuit is provided. The pixel circuit includes a data writing sub-circuit, a driving sub-circuit, and one or more potential maintenance sub-circuits. The data writing sub-circuit is coupled to at least a first voltage signal terminal, a data signal terminal, a first scan signal terminal and a first node, and the data writing sub-circuit is configured to write a data signal provided by the data signal terminal into the first node under control of at least a first scan signal provided by the first scan signal terminal. The driving sub-circuit is coupled to the first node, a second node and a third node, and the driving sub-circuit is configured to create a path between the second node and the third node under control of a potential at the first node. A potential maintenance sub-circuit is coupled to a circuit node and a reference signal terminal, and the potential maintenance sub-circuit is configured to maintain a potential at the circuit node through a reference signal provided by the reference signal terminal. The circuit node is any of the first node, the second node and the third node.

In some embodiments, the potential maintenance sub-circuit includes at least one first transistor. One of a control electrode and a signal electrode of a first transistor is coupled to the circuit node, and another of the control electrode and the signal electrode of the first transistor is coupled to the reference signal terminal. The signal electrode of the first transistor is a first electrode or a second electrode of the first transistor.

In some embodiments, the potential maintenance sub-circuit includes two first transistors. Control electrodes of the two first transistors are both coupled to the reference signal terminal, and same signal electrodes of the two first transistors are coupled to a same circuit node. Alternatively, the same signal electrodes of the two first transistors are coupled to the reference signal terminal, and the control electrodes of the two first transistors are both coupled to the same circuit node.

In some embodiments, the potential maintenance sub-circuit is coupled to the first node and the reference signal terminal. In a case where a potential of the first scan signal is an ineffective potential, a difference between the potential at the first node and a potential of the reference signal is approximately equal to a difference between the potential of the first scan signal and the potential at the first node.

In some embodiments, the data writing sub-circuit is further coupled to a first control signal terminal, and the data writing sub-circuit includes a data writing module, a compensation module and a storage module. The data writing module is coupled to the first control signal terminal, the data signal terminal and the second node, and the data writing module is configured to write the data signal provided by the data signal terminal into the second node under control of a first control signal provided by the first control signal terminal. The compensation module is coupled to the first scan signal terminal, the third node and the first node, and the compensation module is configured to, in a case where the driving sub-circuit writes the data signal at the second node into the third node and under control of the first scan signal provided by the first scan signal terminal, write the data signal at the third node into the first node. The storage module is coupled to the first node and the first voltage signal terminal, and the storage module is configured to store the potential at the first node.

In some embodiments, the data writing module includes a third transistor. A control electrode of the third transistor is coupled to the first control signal terminal, a first electrode of the third transistor is coupled to the data signal terminal, and a second electrode of the third transistor is coupled to the second node. The third transistor is configured to write the data signal provided by the data signal terminal into the second node under the control of the first control signal provided by the first control signal terminal.

In some embodiments, the first scan signal terminal is also used as the first control signal terminal, and the first control signal is the first scan signal.

In some embodiments, the data writing sub-circuit is further coupled to a second scan signal terminal. The data writing sub-circuit includes a data writing module, a compensation module and a storage module. The data writing module is coupled to the second scan signal terminal, the data signal terminal and the second node, and the data writing module is configured to write the data signal provided by the data signal terminal into the second node under control of a second scan signal provided by the second scan signal terminal. The compensation module is coupled to the first scan signal terminal, the third node and the first node, and the compensation module is configured to, in a case where the driving sub-circuit writes the data signal at the second node into the third node and under control of the first scan signal provided by the first scan signal terminal, write the data signal at the third node into the first node. The storage module is coupled to the first node and the first voltage signal terminal, and the storage module is configured to store the potential at the first node.

In some embodiments, the compensation module includes a fourth transistor. A control electrode of the fourth transistor is coupled to the first scan signal terminal, a first electrode of the fourth transistor is coupled to the third node, and a second electrode of the fourth transistor is coupled to the first node. The fourth transistor is configured to, in the case where the driving sub-circuit writes the data signal at the second node into the third node and under the control of the first scan signal provided by the first scan signal terminal, write the data signal at the third node into the first node.

In some embodiments, the storage module includes a storage capacitor. A first electrode plate of the storage capacitor is coupled to the first voltage signal terminal, and a second electrode plate of the storage capacitor is coupled to the first node. The storage capacitor is configured to store the potential at the first node.

In some embodiments, the pixel circuit further includes a first light-emitting control sub-circuit and a second light-emitting control sub-circuit. The first light-emitting control sub-circuit is coupled to an enable signal terminal, the first voltage signal terminal and the second node. The second light-emitting control sub-circuit is coupled to the enable signal terminal, the third node and a fourth node. The first light-emitting control sub-circuit and the second light-emitting control sub-circuit are configured to, under control of an enable signal provided by the enable signal terminal, create a path between the first voltage signal terminal and the fourth node in cooperation with the driving sub-circuit.

In some embodiments, the pixel circuit further includes a first reset sub-circuit and a second reset sub-circuit. The first reset sub-circuit is coupled to a reset signal terminal, a first initialization signal terminal and the first node, and the first reset sub-circuit is configured to write a first initialization signal provided by the first initialization signal terminal into the first node under control of a reset signal provided by the reset signal terminal. The second reset sub-circuit is coupled to a second control signal terminal, a second initialization signal terminal and the fourth node, and the second reset sub-circuit is configured to write a second initialization signal provided by the second initialization signal terminal into the fourth node under control of a second control signal provided by the second control signal terminal.

The potential maintenance sub-circuit is coupled to the first node and the reference signal terminal. In a case where a potential of the reset signal is an ineffective potential, a difference between the potential at the first node and a potential of the reference signal is approximately equal to a difference between a potential of the reset signal and the potential at the first node. Alternatively, in a case where the potential of the reset signal and a potential of the first scan signal are both ineffective potentials, the difference between the potential at the first node and the potential of the reference signal is approximately equal to a sum of the difference between the potential of the reset signal and the potential at the first node and a difference between the potential of the first scan signal and the potential at the first node.

In some embodiments, the reset signal terminal is also used as the second control signal terminal, and the second control signal is the reset signal.

In some embodiments, the pixel circuit further includes a first reset sub-circuit and a second reset sub-circuit. The first reset sub-circuit is coupled to a reset signal terminal, a first initialization signal terminal and the first node, and the first reset sub-circuit is configured to write a first initialization signal provided by the first initialization signal terminal into the first node under control of a reset signal provided by the reset signal terminal. The second reset sub-circuit is coupled to a second scan signal terminal, a second initialization signal terminal and the fourth node, and the second reset sub-circuit is configured to write a second initialization signal provided by the second initialization signal terminal into the fourth node under control of a second scan signal provided by the second scan signal terminal.

In some embodiments, the first initialization signal terminal is also used as the reference signal terminal and is coupled to at least one of the one or more potential maintenance sub-circuits; and/or the second initialization signal terminal is also used as the reference signal terminal and is coupled to at least one of the one or more potential maintenance sub-circuits.

In another aspect, a driving method of a pixel circuit is provided. The pixel circuit includes a data writing sub-circuit, a driving sub-circuit, and one or more potential maintenance sub-circuits. The data writing sub-circuit is coupled to at least a first voltage signal terminal, a data signal terminal, a first scan signal terminal and a first node, and the data writing sub-circuit is configured to write a data signal provided by the data signal terminal into the first node under control of at least a first scan signal provided by the first scan signal terminal. The driving sub-circuit is coupled to the first node, a second node and a third node, and the driving sub-circuit is configured to create a path between the second node and the third node under control of a potential at the first node. A potential maintenance sub-circuit is coupled to a circuit node and a reference signal terminal, and the potential maintenance sub-circuit is configured to maintain a potential at the circuit node through a reference signal provided by the reference signal terminal. The circuit node is any of the first node, the second node and the third node.

A frame of display period includes at least a writing phase and a light-emitting phase. The driving method include: in the writing phase, the data writing sub-circuit writing the data signal into the first node; in the light-emitting phase, the second node being communicated with the first voltage signal terminal, and the driving sub-circuit forming the path between the second node and the third node, so as to drive a light-emitting device communicated with the third node to emit light; and in a case where the potential maintenance sub-circuit is coupled to the first node, at least in the light-emitting phase, the potential maintenance sub-circuit maintaining the potential at the first node through the reference signal provided by the reference signal terminal.

In yet another aspect, a display panel is provided. The display panel includes: a base substrate, and a plurality of data lines, a plurality of gate lines, and a plurality of pixel regions defined by the plurality of data lines and the plurality of gate lines. The plurality of data lines, the plurality of gate lines, and the plurality of pixel regions are disposed on the base substrate. Each pixel region includes the pixel circuit as described in any of the above embodiments, and the pixel circuit includes at least one first transistor, a second transistor, a third transistor, a fourth transistor, a fifth transistor, a sixth transistor, a seventh transistor, an eighth transistor and a storage capacitor.

In some embodiments, the display panel includes a semiconductor layer, a first conductive layer, a second conductive layer, a third conductive layer and a fourth conductive layer that are sequentially arranged in a direction away from the base substrate. The semiconductor layer includes active layers of all the transistors in the pixel circuit. The first conductive layer includes first scan signal lines, second scan signal lines, enable signal lines, and control electrodes of the plurality of transistors. The first scan signal lines, the second scan signal lines and the enable signal lines extend along a first direction.

In some embodiments, the first conductive layer includes a first conductive pattern and a second conductive pattern. The first conductive pattern is used as a control electrode of the third transistor, and the first conductive pattern and a second scan signal line are of a one-piece structure. The second conductive pattern is used as a control electrode of the fourth transistor, and the second conductive pattern and a first scan signal line are of a one-piece structure.

In some embodiments, the first conductive layer includes a first conductive pattern and a third conductive pattern. The first conductive pattern is used as a control electrode of the third transistor, and the third conductive pattern is used as a control electrode of the eighth transistor. The first conductive pattern, the third conductive pattern, and a second scan signal line are of a one-piece structure.

In some embodiments, the first conductive layer further includes a second electrode plate of the storage capacitor and a fourth conductive pattern. The second electrode plate is also used as a control electrode of the second transistor. The fourth conductive pattern is used as a control electrode of a first transistor in the at least one first transistor. The fourth conductive pattern extends along the first direction, and the fourth conductive pattern and the second electrode plate are of a one-piece structure.

In some embodiments, the first conductive layer further includes a fifth conductive pattern and a sixth conductive pattern. The fifth conductive pattern is used as a control electrode of the fifth transistor, and the sixth conductive pattern is used as a control electrode of the sixth transistor. The fifth conductive pattern, the sixth conductive pattern and an enable signal line are of a one-piece structure.

In some embodiments, the fourth conductive layer includes first voltage signal lines, the data lines and reference signal lines. The first voltage signal lines, the data lines and the reference signal lines extend along a second direction, the first direction and the second direction intersects each other. An orthographic projection of a first voltage signal line on the base substrate at least partially overlaps with each of orthographic projections of a control electrode of the second transistor and a control electrode of the fifth transistor on the base substrate.

In some embodiments, the pixel circuit includes two first transistors, same signal electrodes of the two first transistors are coupled to the reference signal terminal, and control electrodes of the two first transistors are coupled to the first node. An orthographic projection of a reference signal line on the base substrate at least partially overlaps with an orthographic projection of a control electrode of a first transistor in the two first transistors on the base substrate. A data line includes first main body portions and second main body portions each extend along the second direction. A portion of a second main body portion is bent along the first direction and is coupled to a first main body portion. An orthographic projection of the first main body portion on the base substrate at least partially overlaps with an orthographic projection of a control electrode of another first transistor in the two first transistors on the base substrate, and an orthographic projection of the second main body portion on the base substrate at least partially overlaps with an orthographic projection of a control electrode of the third transistor on the base substrate. The reference signal line and the first voltage signal line that are connected to a same column of pixel circuits are located on two sides of the data line connected to the same column of pixel circuits, respectively.

In yet another aspect, a display apparatus is provided. The display apparatus includes the display panel as described in any of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these accompanying drawings. In addition, the accompanying drawings to be described below may be regarded as schematic diagrams, but are not limitations on actual sizes of products, actual processes of methods and actual timings of signals involved in the embodiments of the present disclosure.

DETAILED DESCRIPTION

Figure 1:
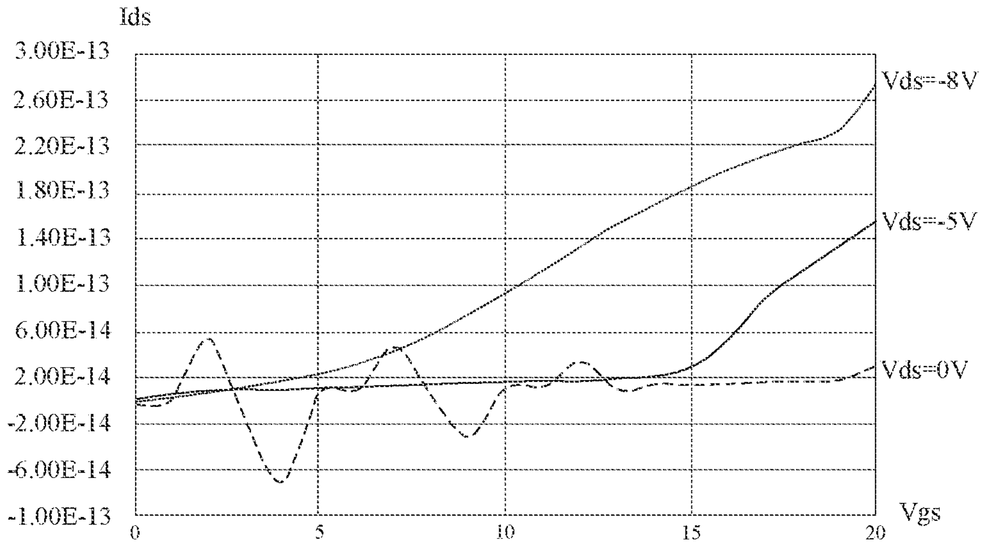
FIG. 1 is a curve graph of electric leakage of a transistor, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of", "the plurality of" or "multiple" means two or more unless otherwise specified.

In the description of some embodiments, the expressions "coupled" and "connected" and derivatives thereof may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, depending on the context, the term "if" is optionally construed as "when", "in a case where", "in response to determining" or "in response to detecting". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The phrase "applicable to" or "configured to" as used herein means an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

As used herein, terms such as "about", "substantially" or "approximately" include a stated value and an average value within an acceptable range of deviation of a particular value. The acceptable range of deviation is determined by a person of ordinary skill in the art in view of the measurement in question and the error associated with the measurement of a particular quantity (i.e., the limitation of the measurement system).

As used herein, the term such as "parallel", "perpendicular" or "equal" includes a stated condition and a condition similar to the stated condition. A range of the similar condition is within an acceptable range of deviation, and the acceptable range of deviation is determined by a person of ordinary skill in the art in view of measurement in question and errors associated with measurement of a particular quantity (i.e., the limitation of the measurement system). For example, the term "parallel" includes absolute parallelism and approximate parallelism, and an acceptable range of deviation of the approximate parallelism may be a deviation within 5°; the term "perpendicular" includes absolute perpendicularity and approximate perpendicularity, and an acceptable range of deviation of the approximate perpendicularity may also be a deviation within 5°; and the term "equal" includes absolute equality and approximate equality, and an acceptable range of deviation of the approximate equality may be a difference between two equals being less than or equal to 5% of either of the two equals.

In addition, as used herein, "a potential of a signal being an effective potential" refers to that the potential, capable of controlling a transistor to be in a turned-on state, of the signal. For example, a gate of the transistor receives the signal at the effective potential, so that the transistor is in the turned-on state. As used herein, "a potential of the signal being at an ineffective potential" refers to that the potential, capable of controlling the transistor to be in a turned-off state, of the signal. For example, the gate of the transistor receives the signal at the ineffective potential, so that the transistor is in the turned-off state.

It will be noted that, transistors used in a pixel circuit provided in embodiments of the present disclosure may be thin film transistors, field effect transistors or other switching devices with the same characteristics. The transistors in the embodiments of the present disclosure may be enhancement-mode transistors or depletion-mode transistors, which are not limited in the present disclosure.

In each transistor adopted in the pixel circuit, a control electrode thereof is a gate of the transistor, a first electrode thereof is one of a source and a drain of the transistor, and a second electrode thereof is another of the source and the drain of the transistor. Since the source and the drain of the transistor may be symmetrical in structure, the source and the drain of the transistor may be indistinguishable in structure. That is, the first electrode and the second electrode of the transistor in the embodiments of the present disclosure may be indistinguishable in structure. For example, in a case where the transistor is a P-type transistor, the first electrode of the transistor is a source, and the second electrode of the transistor is a drain. For example, in a case where the transistor is an N-type transistor, the first electrode of the transistor is the drain, and the second electrode of the transistor is the source.

It will also be noted that the high-potential signal and the low-potential signal that are mentioned in the embodiments of the present disclosure are relatively high and low, that is, only a potential of the high-potential signal is higher than that of the low-potential signal, and specific potential values of the high potential and the low potential are not limited.

Exemplary embodiments are described herein with reference to sectional views and/or plan views as idealized exemplary drawings. In the accompanying drawings, thicknesses of layers and sizes of regions are enlarged for clarity. Variations in shapes relative to the accompanying drawings due to, for example, manufacturing technologies and/or tolerances may be envisaged. Therefore, the exemplary embodiments should not be construed as being limited to the shapes of the regions shown herein, but including deviations in the shapes due to, for example, manufacturing. For example, an etched region shown in a rectangular shape generally has a feature of being curved. Therefore, the regions shown in the accompanying drawings are schematic in nature, and their shapes are not intended to show actual shapes of regions in an apparatus, and are not intended to limit the scope of the exemplary embodiments.

In the related art, in a case where a display apparatus has a refresh frequency of 1 Hz or lower, a light-emitting duration corresponding to a frame of display period can reach 1 second or more. During a light-emitting phase in the frame of display period, some circuit nodes in the pixel circuit need to maintain stable. However, since an electric leakage path exists between any two of a source, a drain and a gate of a transistor that is connected to a circuit node, so that a potential at the circuit node is changed (the potential is raised or lowered) by influence from other signal terminals (which may also be referred to as leakage signal terminals).

As shown in FIG. 1, for example, in a case where a voltage difference exists between a gate and a source of a low temperature polycrystalline silicon (LTPS) transistor, an electric leakage path communicated with the gate and the source may exist in the transistor; and in a case where a voltage difference exists between the gate and a drain of the LTPS transistor, an electric leakage path communicated with the gate and the drain may exist in the transistor.

Figure 2:
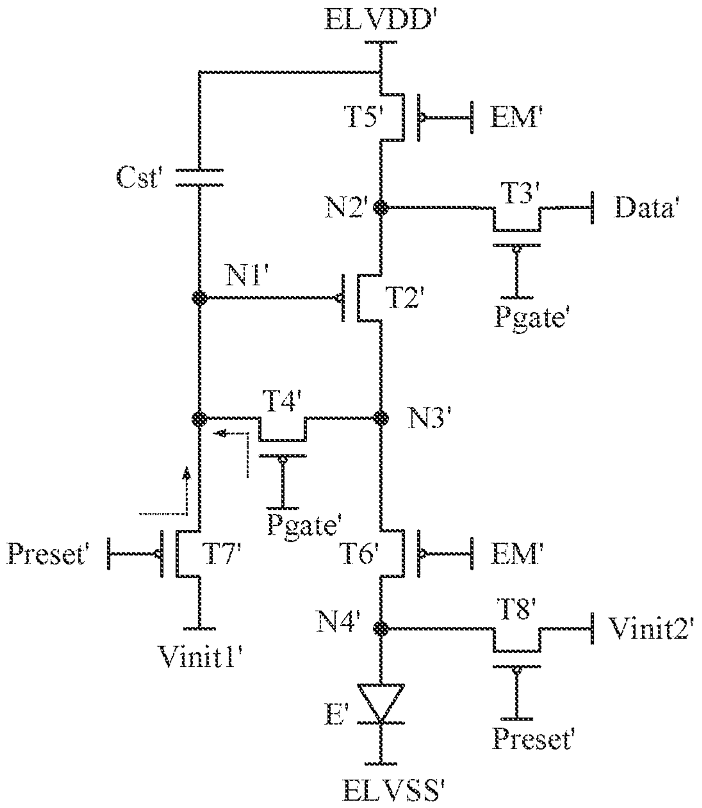
FIG. 2 is a structural diagram of a pixel circuit, in accordance with some embodiments.
Figure 3:
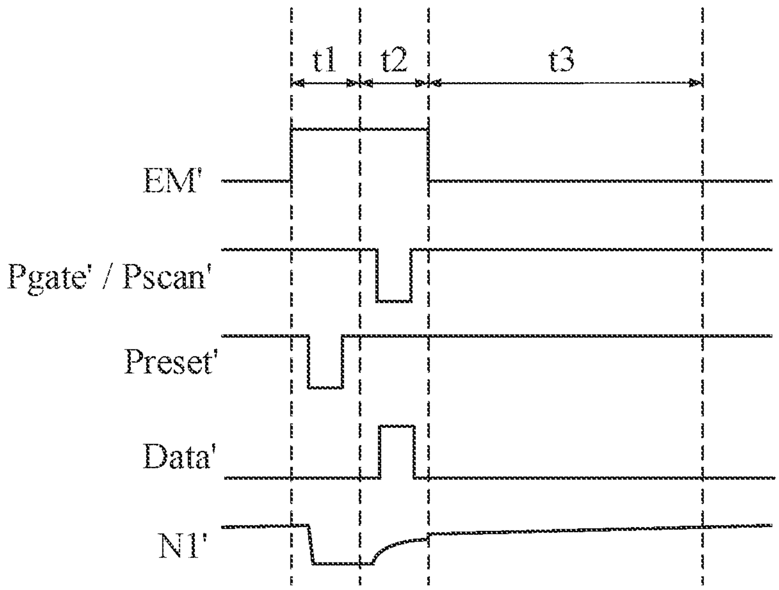
FIG. 3 is a timing diagram of a pixel circuit, in accordance with some embodiments.
Figure 4:
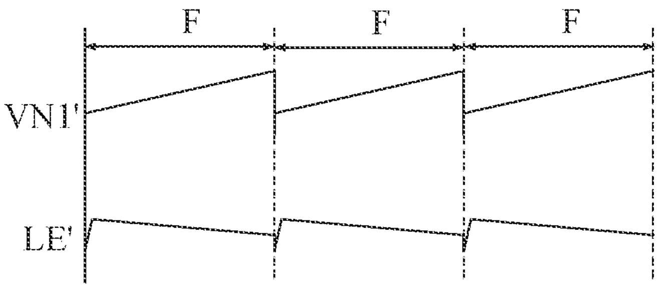
FIG. 4 is a timing diagram showing a first node in a pixel circuit and a light-emitting efficiency of a light-emitting device in a frame of display period, in accordance with some embodiments.

As shown in FIG. 2, in some implementations, a first node N1' is coupled to a drain of a transistor T4' and a drain of a transistor T7'. As shown in FIG. 3, during the light-emitting phase T3, a reset signal provided by the reset signal terminal Preset' and a first scan signal provided by a first scan signal terminal Pgate' are both at high potentials, so that the transistor T4' and the transistor T7' are both turned off at the same time. As a result, as shown in FIG. 4, the signal provided by the signal terminal Pgate' (in the light-emitting phase T3, a potential of the signal is the high potential, such as VGH) enables the potential at the first node N1' to be raised through an electric leakage path (the electric leakage path is indicated by a dashed arrow in the figure) between the drain and the gate of the transistor T4'; similarly, the signal provided by the signal terminal Preset' (in the light-emitting phase T3, a potential of the signal is the high potential, such as VGH) enables the potential at the first node N1' to be raised through an electric leakage path between the drain and the gate of the transistor T7'.

A change of the potential at the circuit node in the pixel circuit will further cause a conductive degree of the transistor T2' to change, so that a light-emitting efficiency of a light-emitting device changes. For example, as shown in FIGS. 2 and 4, the change of the potential VN1' at the first node N1' during the frame F of display period will cause the conductive degree of the transistor T2' to change, which leads to the light-emitting efficiency LE' of the light-emitting device E' to be changed. In this way, it may cause problems such as flicker and insufficient contrast in the display of the display apparatus.

In light of this, embodiments of the present disclosure provide a pixel circuit and a driving method thereof, a display panel and a display apparatus, each of which is used to alleviate the problems of flicker and insufficient contrast in the display of the display apparatus.

The display apparatus provided in the embodiments of the present disclosure may be any apparatus that displays images whether in motion (e.g., a video) or stationary (e.g., a still image), and regardless of text or image. More specifically, it is anticipated that the embodiments may be implemented in or associated with a variety of electronic devices. The variety of electronic devices include (but are not limited to), for example, mobile phones, wireless devices, personal digital assistants (PDAs), hand-held or portable computers, global positioning system (GPS) receivers/navigators, cameras, MPEG-4 Part 14 (MP4) video players, video cameras, game consoles, watches, clocks, calculators, television monitors, flat panel displays, computer monitors, automobile displays (e.g., odometer displays), navigators, cockpit controllers and/or displays, camera view displays (e.g., rear view camera displays in a vehicle), electronic photos, electronic billboards or signs, projectors, architectural structures, packaging and aesthetic structures (e.g., displays for displaying an image of a piece of jewelry).

The display apparatus includes a frame, and the display panel, a circuit board, a display driver integrated circuit (IC) and other electronic components that are disposed in the frame.

The display panel may be an organic light-emitting diode (OLED) display panel, a quantum dot light-emitting diode (QLED) display panel, or a micro light-emitting diode (Micro LED) display panel, which is not specifically limited in the embodiments of the present disclosure.

The following embodiments of the present disclosure are all described by considering an example in which the display panel is the OLED display panel.

Figure 5:
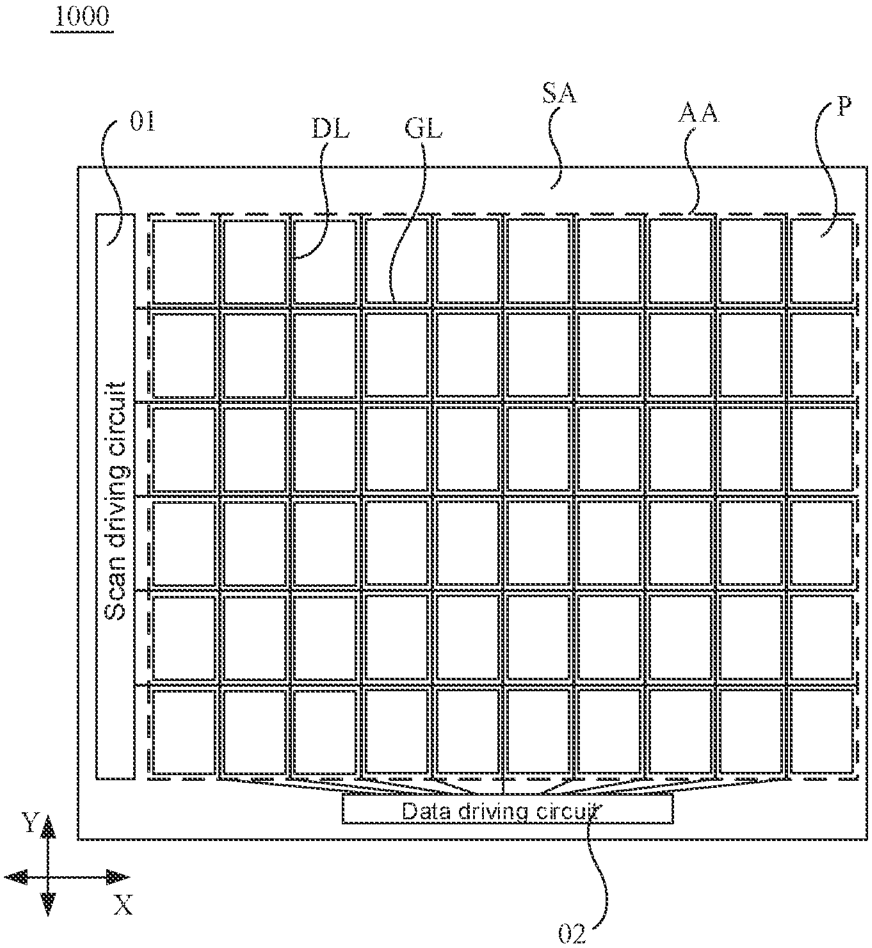
FIG. 5 is a structural diagram of a display apparatus, in accordance with some embodiments.
Figure 6:
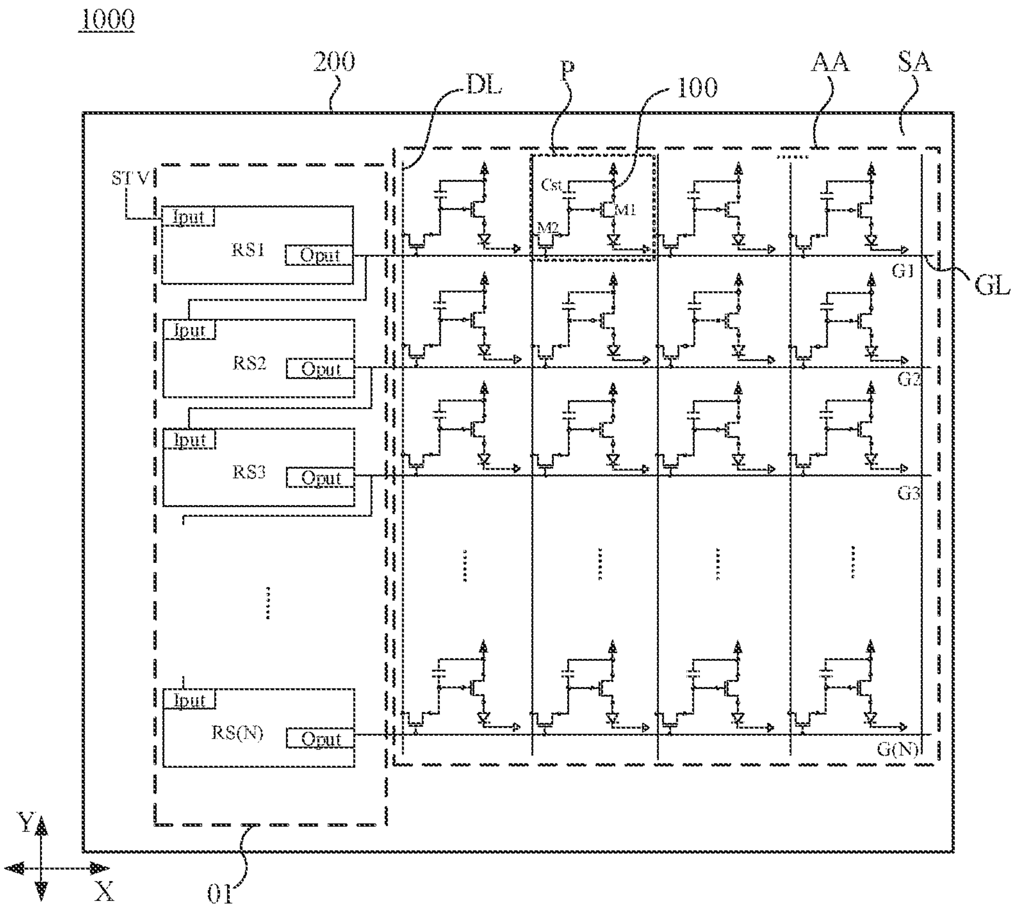
FIG. 6 is a structural diagram of another display apparatus, in accordance with some embodiments.

As shown in FIGS. 5 and 6, the display panel 1000 includes an active area AA (which may also be referred to as an effective display area) and a peripheral area SA arranged around the active area AA.

The display panel 1000 includes scan driving circuit(s) 01 and a data driving circuit 02 that are located in the peripheral area. In some embodiments, referring to FIG. 5, the scan driving circuit 01 may be disposed at a side of the display panel 1000 in an extending direction (e.g., a first direction X) of a gate line GL, and the data driving circuit 02 may be disposed at a side of the display panel 1000 in the extending direction (e.g., a second direction Y) of a data line DL, so that pixel circuits 100 in the display panel are driven to achieve display.

In some embodiments, the scan driving circuit 01 may include a gate driver IC. In some other embodiments, the scan driving circuit 01 may be a gate driver on array (GOA)

circuit, that is, as shown in FIGS. 5 and 6, the scan driving circuit 01 is directly integrated in an array substrate of the display panel 1000. By setting the scan driving circuit 01 as the GOA circuit rather than the scan driver IC, it may be possible to not only reduce costs for manufacturing the display panel, but also reduce the frame width of the display apparatus.

It will be noted that, FIGS. 5 and 6 are merely illustrative, and are described in an example in which the scan driving circuit 01 is arranged at a single side of the display panel 1000 in the peripheral area, and gate lines GL are sequentially driven row by row (that is, the gate lines GL are driven in a single-sided driving manner). In some other embodiments, scan driving circuits may be arranged at two sides, in the extending direction of the gate line GL, of the display panel 1000 in the peripheral area, and the gate lines GL are sequentially driven row by row through the two scan driving circuits from two sides simultaneously (that is, the gate lines GL are driven in a double-sided driving manner). In some other embodiments, scan driving circuits may be arranged at the two sides, in the extending direction of the gate line GL, of the display panel 1000 in the peripheral area, and the gate lines GL are sequentially driven row by row through the two scan driving circuits from two sides alternately (that is, the gate lines GL are driven in an alternated driving manner).

The display panel 1000 includes sub-pixels P of a plurality of colors in the active area, the sub-pixels of the plurality of colors include at least sub-pixels of a first color, sub-pixels of a second color and sub-pixels of a third color. The first color, the second color and the third color may be three primary colors (e.g., red, green and blue).

For convenience of description, in the embodiments of the present disclosure, a plurality of sub-pixels P are described by considering an example in which the plurality of sub-pixels P are arranged in a matrix. In this case, sub-pixels P arranged in a line along the first direction X are referred to as a same row of sub-pixels P, and sub-pixels P arranged in a line along the second direction Y are referred to as a same column of sub-pixels P.

As shown in FIG. 6, in the OLED display panel 1000, each sub-pixel P includes a pixel circuit (which may also referred to as a pixel driving circuit) 100, and the pixel circuit 100 includes transistors and capacitor(s). FIG. 6 is illustrated by considering an example in which the pixel circuit 100 is of a 2T1C structure (one driving transistor M1, one switching transistor M2 and one capacitor Cst), and a specific structure of the pixel circuit is not limited in the embodiments of the present disclosure. For example, the pixel circuit may be of a 3T1C structure, a 4T1C structure or a 7T1C structure. As shown in FIG. 6, in the display panel 1000, control electrodes of the switching transistors M2 of pixel circuits 100 located in a same row are coupled to a same gate line GL, and electrodes (e.g., sources) of switching transistors M2 of pixel circuits 100 located in a same column are coupled to a same data line DL.

Figure 7:
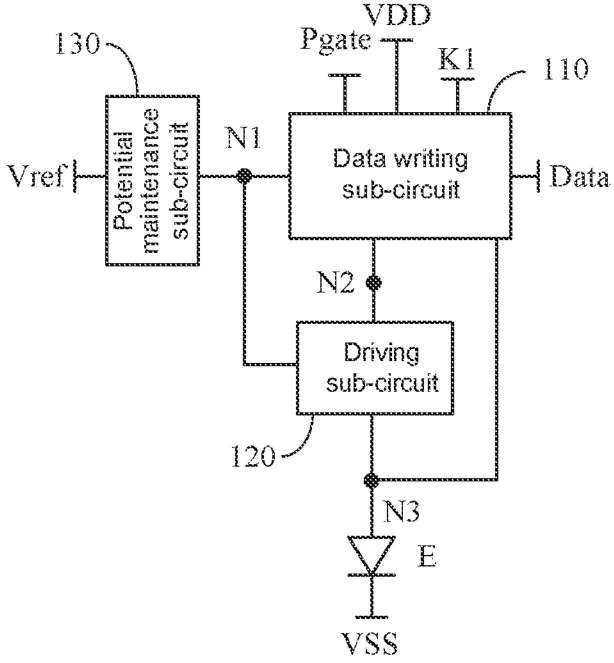
FIG. 7 is a structural diagram of another pixel circuit, in accordance with some embodiments.

Based on this, as shown in FIG. 7, some embodiments of the present disclosure provide the pixel circuit 100. The pixel circuit 100 includes a data writing sub-circuit 110, a driving sub-circuit 120, one or more potential maintenance sub-circuits 130 and a light-emitting device E.

The data writing sub-circuit 110 is coupled to at least a first voltage signal terminal VDD, a data signal terminal Data, a first scan signal terminal Pgate and a first node N1. The data writing sub-circuit 110 is configured to write a data signal into the first node N1 under control of at least a first scan signal provided by the first scan signal terminal Pgate.

Figure 8:
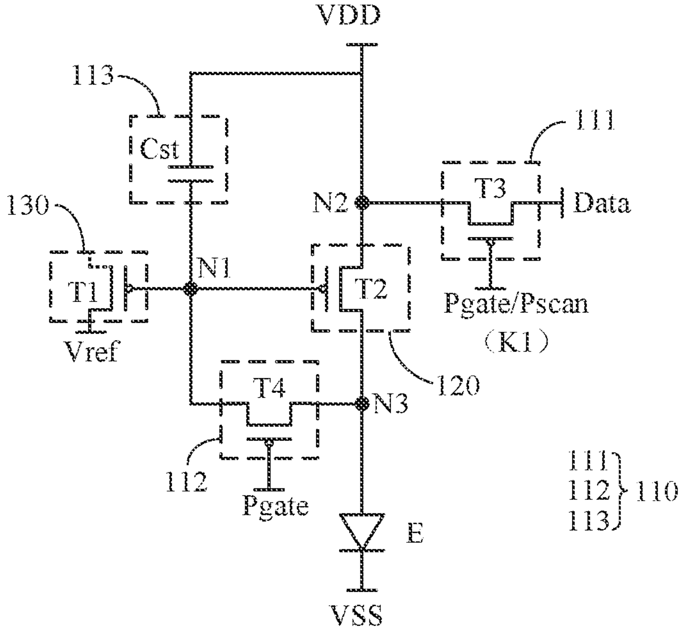
FIG. 8 is a structural diagram of another pixel circuit, in accordance with some embodiments.

The data writing sub-circuit 110 is coupled to at least the first voltage signal terminal VDD, the data signal terminal Data, the first scan signal terminal Pgate and the first node N1, which means that the data writing sub-circuit 110 may be coupled to only the first voltage signal terminal VDD, the data signal terminal Data, the first scan signal terminal Pgate and the first node N1, or the data writing sub-circuit 110 may be further coupled to other signal terminal(s) or circuit node(s) on a basis of being coupled to the first voltage signal terminal VDD, the data signal terminal Data, the first scan signal terminal Pgate and the first node N1. For example, as shown in FIG. 8, the data writing sub-circuit 110 may be further coupled to a second scan signal terminal Pscan. It will be noted that, the curly bracket in FIG. 8 refers to numerals 111, 112 and 113 all belonging to 110.

In some examples, the data writing sub-circuit 110 may be further coupled to a second node N2 and a third node N3. The data signal (a potential of which is Vdata) being written into the first node N1 may be understood as that the data signal is transmitted to the first node N1 through the second node N2 and/or the third node N3. For example, the data signal is written into the first node N1 after passing through the second node N2 and the third node N3 in sequence.

The driving sub-circuit 120 is coupled to the first node N1, the second node N2 and the third node N3. The driving sub-circuit 120 is configured to create a path between the second node N2 and the third node N3 under control of a potential at the first node N1.

In some examples, as shown in FIGS. 7 and 8, the data writing sub-circuit 110 may write the data signal provided by the data signal terminal Data into the second node N2. The driving sub-circuit 120 forms the path between the second node N2 and the third node N3 based on the potential at the first node N1, so as to write the data signal into the third node N3. The data writing sub-circuit 110 may further transmit the data signal at the third node N3 to the first node N1.

In some examples, the second node N2 may be coupled to the first voltage signal terminal VDD, the third node N3 may be coupled to an anode of the light-emitting device E, and a cathode of the light-emitting device E may be coupled to a second voltage signal terminal VSS. For example, a potential of a first voltage signal provided by the first voltage signal terminal VDD is greater than a potential of a second voltage signal provided by the second voltage signal terminal VSS.

The driving sub-circuit 120 may create the path between the second node N2 and the third node N3 under control of a light-emitting compensation signal ((Vdata+Vth), where Vth may be, for example, a threshold voltage of a driving transistor) at the first node N1. In a case where the second node N2 is communicated with the first voltage signal terminal VDD, the first voltage signal provided by the first voltage signal terminal VDD is written into the third node N3 (that is, the first voltage signal is written into the anode of the light-emitting device E) by the driving sub-circuit 120, so that the light-emitting device E is driven to emit light.

The light-emitting device E is described by considering an OLED light-emitting device as an example. The anode of the light-emitting device E may be directly coupled to the third node N3. For example, the anode of the light-emitting device E is electrically connected to the third node N3. Alternatively, the anode of the light-emitting device E may be indirectly coupled to the third node N3. For example, the anode of the light-emitting device E is electrically connected to the third node N3 through transistor(s).

The number of the light-emitting devices E may be one or more, which is not limited here.

A potential maintenance sub-circuit 130 is coupled to a circuit node and a reference signal terminal Vref. The potential maintenance sub-circuit 130 is configured to maintain a potential at the circuit node coupled to the potential maintenance sub-circuit 130 through a reference signal provided by the reference signal terminal Vref. The circuit node is any of the first node N1, the second node N2 and the third node N3.

In some examples, as shown in FIG. 7, the pixel circuit 100 includes one potential maintenance sub-circuit 130, and the potential maintenance sub-circuit 130 is coupled to the reference signal terminal Vref and the first node N1.

In some embodiments, a single potential maintenance sub-circuit 130 is coupled to a circuit node, and different potential maintenance sub-circuits 130 are respectively coupled to different circuit nodes. The different potential maintenance sub-circuits 130 are respectively configured to maintain potentials of the different circuit nodes.

In some examples, the pixel circuit 100 includes a first potential maintenance sub-circuit, a second potential maintenance sub-circuit and a third potential maintenance sub-circuit. The first potential maintenance sub-circuit is coupled to the first node N1 (as shown in FIGS. 7 and 8), the second potential maintenance sub-circuit is coupled to the second node N2 (not shown in the figures), and the third potential maintenance sub-circuit is coupled to the third node N3 (not shown in the figures). The first potential maintenance sub-circuit is configured to maintain a potential at the first node N1, the second potential maintenance sub-circuit is configured to maintain a potential at the second node N2, and the third potential maintenance sub-circuit is configured to maintain a potential at the third node N3.

In some embodiments, the different potential maintenance sub-circuits 130 may be coupled to different reference signal terminals Vref, respectively. For example, two potential maintenance sub-circuits 130 are coupled to two reference signal terminals Vref, respectively.

In some other embodiments, at least two potential maintenance sub-circuits 130 may be coupled to a same reference signal terminal Vref. For example, in three potential maintenance sub-circuits 130, two potential maintenance sub-circuits 130 are coupled to a single reference signal terminal Vref, and the other potential maintenance sub-circuit 130 is coupled to another reference signal terminal Vref. As another example, the three potential maintenance sub-circuits 130 are all coupled to a same reference signal terminal Vref.

The potential maintenance sub-circuit(s) 130 form at least one electric leakage compensation path between the reference signal terminal Vref and the circuit node, so that the reference signal may reduce or even eliminate an influence of the electric leakage path utilized by the electric leakage signal terminal on the circuit node. As a result, the potential at the circuit node may be maintained.

In some examples, the number of the electric leakage compensation paths communicated with a circuit node may be equal to the number of the electric leakage paths communicated with the circuit node.

Figure 9:
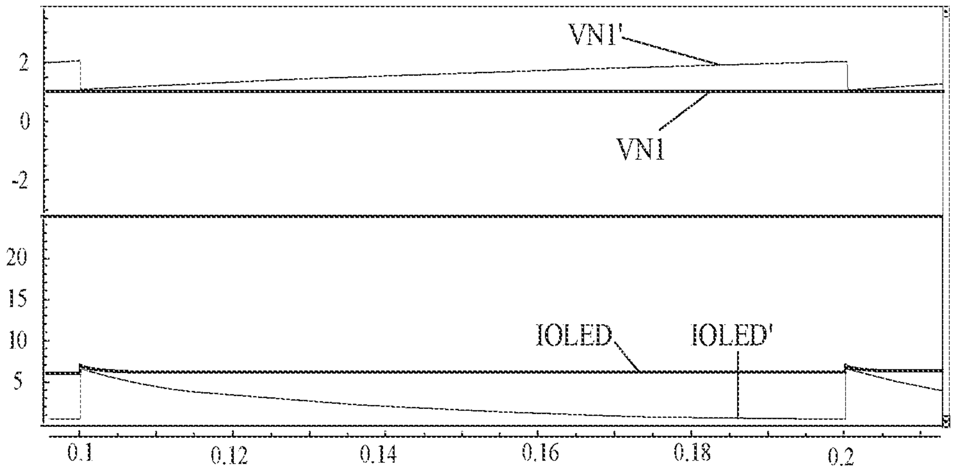
FIG. 9 is a diagram showing a comparison between first nodes in pixel circuits and a comparison between light-emitting efficiencies of first light-emitting devices, in accordance with some embodiments.

Considering the potential maintenance sub-circuit 130 (i.e., the first potential maintenance sub-circuit) being coupled to the first node N1 as an example, as shown in FIG. 9, the potential VN1 at the first node N1 in the pixel circuit provided in the embodiments of the present disclosure is more stable than the potential VN1' at the first node N1' in the pixel circuit shown in FIG. 2. In addition, a driving current IOLED of the light-emitting device in the pixel circuit provided in the embodiments of the present disclosure is more stable than a driving current IOLED' of the light-emitting device in the pixel circuit shown in FIG. 2.

In summary, in the embodiments of the present disclosure, by adding the one or more potential maintenance sub-circuits 130 in the pixel circuit, it is possible to improve the stability of the potential at the at least one circuit node, and further improve the stability of the conductive degree of at least one transistor in the pixel circuit. As a result, the light-emitting device may emit light stably, thereby improving the display performance of the display apparatus.

As shown in FIG. 8, in some embodiments, the driving sub-circuit 120 includes a second transistor T2. A control electrode of the second transistor T2 is coupled to the first node N1, a first electrode of the second transistor T2 is coupled to the second node N2, and a second electrode of the second transistor T2 is coupled to the third node N3. The second transistor T2 is configured to create the path between the second node N2 and the third node N3 under the control of the potential at the first node N1.

In some examples, the second transistor T2 is a P-type transistor. The second transistor T2 is configured to create the path between the first electrode of the second transistor T2 (the second node N2) and the second electrode of the second transistor T2 (the third node N3) in a case where the potential at the first node N1 is a low potential, so as to enable the potential at the second node N2 to be transmitted to the third node N3.

As shown in FIG. 8, in some embodiments, the data writing sub-circuit 110 includes a data writing module 111, a compensation module 112 and a storage module 113.

The data writing module 111 is coupled to a first control signal terminal K1, the data signal terminal Data and the second node N2. The data writing module 111 is configured to write the data signal provided by the data signal terminal Data into the second node N2 under control of a first control signal provided by the first control signal terminal K1.

The first control signal terminal K1 may be the first scan signal terminal Pgate. That is, the first scan signal terminal Pgate is also used as the first control signal terminal K1, and the first control signal is the first scan signal. Alternatively, the first control signal terminal K1 may be the second scan signal terminal Pscan. That is, the second scan signal terminal Pscan is also used as the first control signal terminal K1, and the first control signal is a second scan signal. Of course, in some other embodiments, the first control signal terminal K1 may be an additional signal terminal, which is not limited here.

Figure 12:
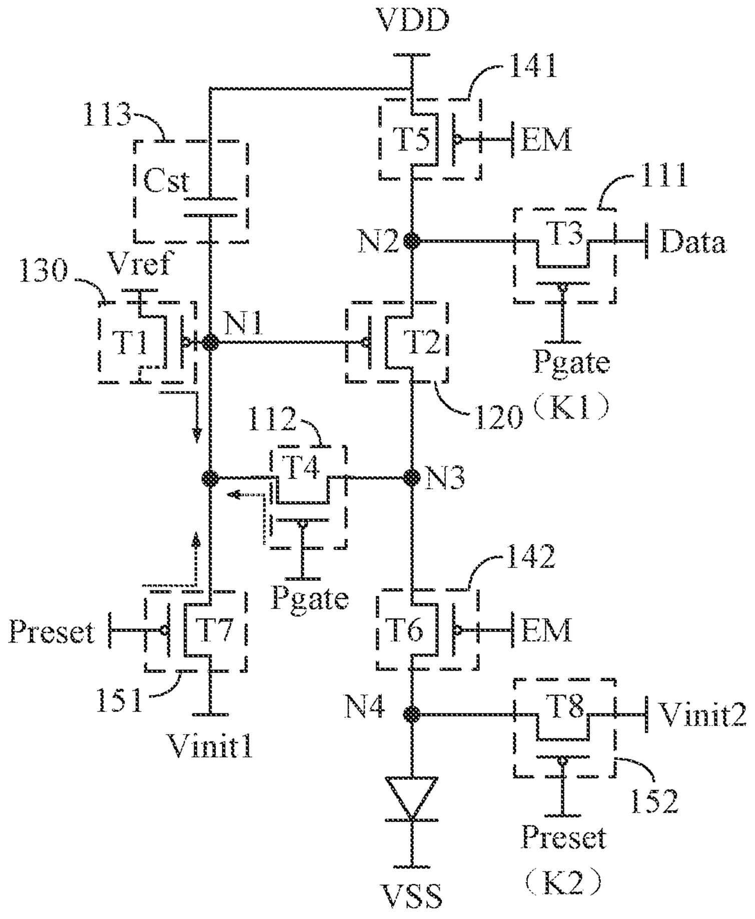
FIG. 12 is a structural diagram of yet another pixel circuit, in accordance with some embodiments.
Figure 13:
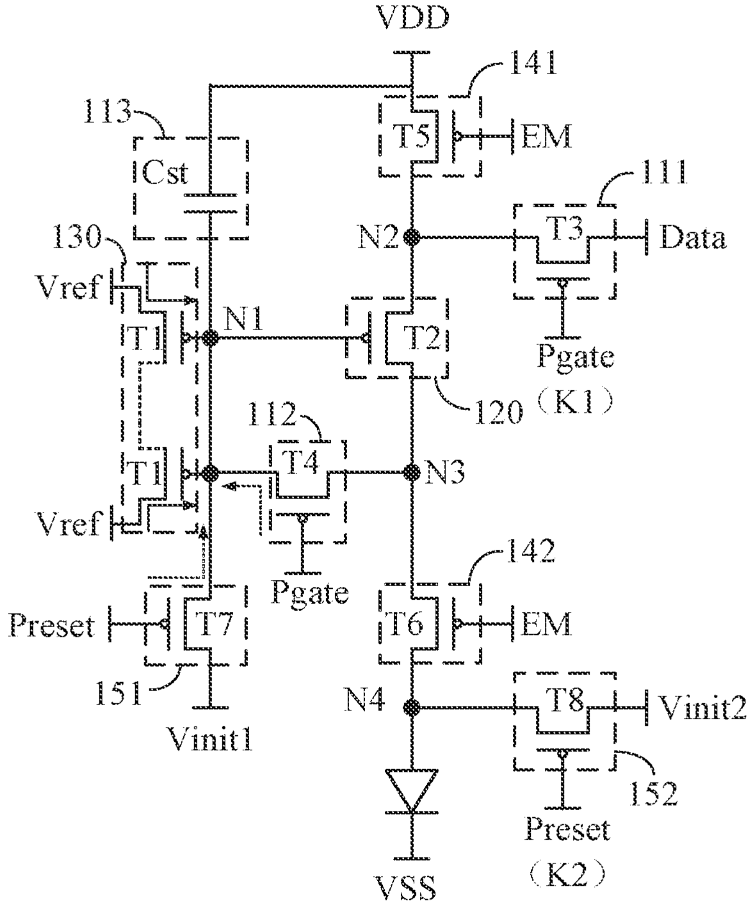
FIG. 13 is a structural diagram of yet another pixel circuit, in accordance with some embodiments.

As shown in FIGS. 12 and 13, in some examples, the first scan signal terminal Pgate is also used as the first control signal terminal K1. The data writing module 111 is coupled to the first scan signal terminal Pgate, the data signal terminal Data and the second node N2. The data writing module 111 is configured to write the data signal provided by the data signal terminal Data into the second node N2 under control of the first scan signal provided by the first scan signal terminal Pgate.

In this case, the data writing sub-circuit 110 is coupled to the first voltage signal terminal VDD, the data signal terminal Data, the first scan signal terminal Pgate and the first node N1.

Figure 10:
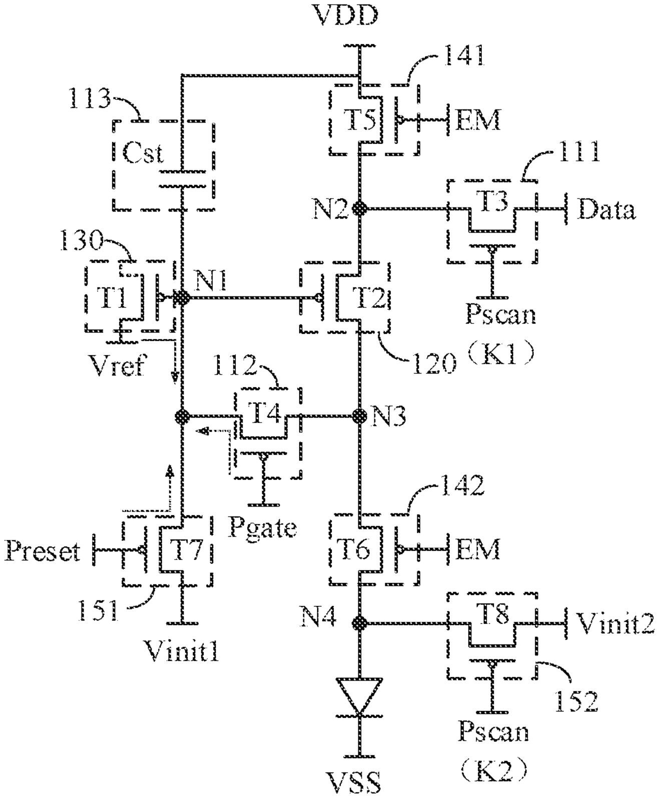
FIG. 10 is a structural diagram of yet another pixel circuit, in accordance with some embodiments.
Figure 11:
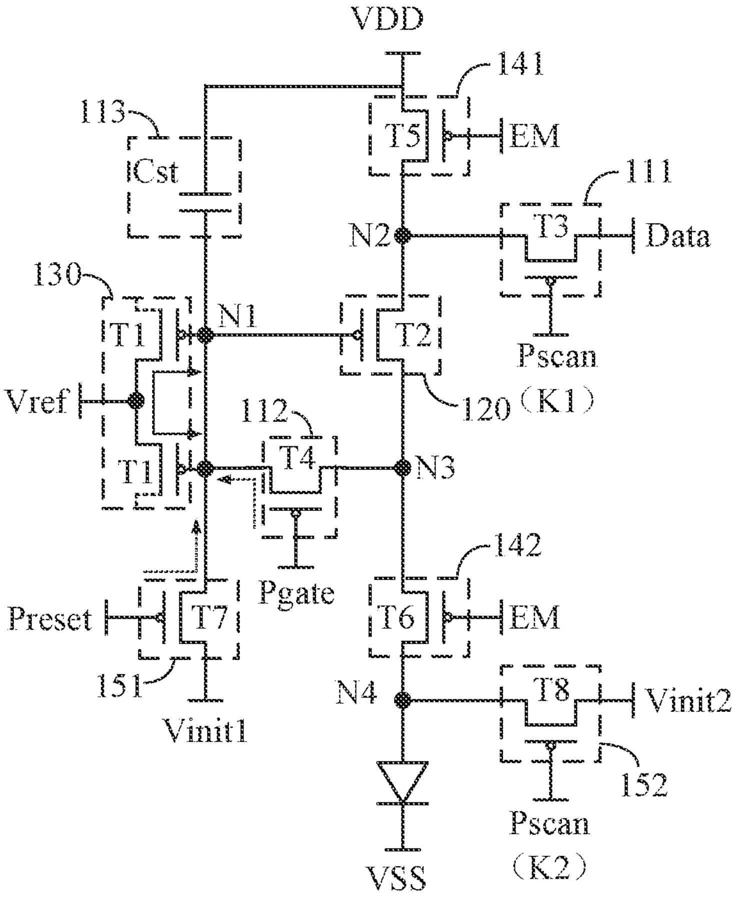
FIG. 11 is a structural diagram of yet another pixel circuit, in accordance with some embodiments.

As shown in FIGS. 10 and 11, in some examples, the second scan signal terminal Pscan is also used as the first control signal terminal K1. The data writing module 111 is coupled to the second scan signal terminal Pscan, the data signal terminal Data and the second node N2. The data writing module 111 is configured to write the data signal provided by the data signal terminal Data into the second node N2 under control of the second scan signal provided by the second scan signal terminal Pscan.

In this case, the data writing sub-circuit 110 is coupled to the first voltage signal terminal VDD, the data signal terminal Data, the first scan signal terminal Pgate, the second scan signal terminal Pscan and the first node N1.

As shown in FIG. 8, in some embodiments, the data writing module 111 includes a third transistor T3. A control electrode of the third transistor T3 is coupled to the first control signal terminal K1, a first electrode of the third transistor T3 is coupled to the data signal terminal Data, and a second electrode of the third transistor T3 is coupled to the second node N2.

The third transistor T3 is configured to write the data signal provided by the data signal terminal Data into the second node N2 under the control of the first control signal provided by the first control signal terminal K1.

As shown in FIGS. 12 and 13, in some examples, the control electrode of the third transistor T3 is coupled to the first scan signal terminal Pgate, the first electrode of the third transistor T3 is coupled to the data signal terminal Data, and the second electrode of the third transistor T3 is coupled to the second node N2. The third transistor T3 is configured to write the data signal provided by the data signal terminal Data into the second node N2 under the control of the first scan signal provided by the first scan signal terminal Pgate.

As shown in FIGS. 10 and 11, in some examples, the control electrode of the third transistor T3 is coupled to the second scan signal terminal Pscan, the first electrode of the third transistor T3 is coupled to the data signal terminal Data, and the second electrode of the third transistor T3 is coupled to the second node N2. The third transistor T3 is configured to write the data signal provided by the data signal terminal Data into the second node N2 under the control of the second scan signal provided by the second scan signal terminal Pscan.

In some examples, the third transistor T3 is configured to create a path between the first electrode of the third transistor T3 (the data signal terminal Data) and the second electrode of the third transistor T3 (the second node N2) in a case where a potential of the first control signal provided by the first control signal terminal K1 is an effective potential, so as to write the data signal provided by the data signal terminal Data into the second node N2.

In some examples, the third transistor T3 is a P-type transistor. In a case where the potential of the first control signal provided by the first control signal terminal K1 is a low potential, the path is formed between the first electrode of the third transistor T3 (the data signal terminal Data) and the second electrode of the third transistor T3 (the second node N2), so that the data signal provided by the data signal terminal Data is written into the second node N2.

As shown in FIG. 8, the compensation module 112 is coupled to the first scan signal terminal Pgate, the third node N3 and the first node N1. The compensation module 112 is configured to write the data signal or the light-emitting compensation signal at the third node N3 into the first node N1 under control of the first scan signal provided by the first scan signal terminal Pgate.

In some examples, in the case where the driving sub-circuit 120 forms the path between the second node N2 and the third node N3 to write the data signal at the second node N2 into the third node N3, the compensation module 112 may write the data signal at the third node N3 into the first node N1.

In some embodiments, the compensation module 112 includes a fourth transistor T4. A control electrode of the fourth transistor T4 is coupled to the first scan signal terminal Pgate, a first electrode of the fourth transistor T4 is coupled to the third node N3, and a second electrode of the fourth transistor T4 is coupled to the first node N1. The fourth transistor T4 is configured to, in the case where the driving sub-circuit 120 writes the data signal at the second node N2 into the third node N3, write the data signal at the third node N3 into the first node N1 under the control of the first scan signal provided by the first scan signal terminal Pgate.

In some examples, in a case where the driving sub-circuit 120 forms the path between the second node N2 and the third node N3 to write the data signal at the second node N2 into the third node N3, and the potential of the first scan signal provided by the first scan signal terminal Pgate is an effective potential, a path is formed between the first electrode of the fourth transistor T4 (the third node N3) and the second electrode of the fourth transistor T4 (the first node N1), so that the data signal at the third node N3 is written into the first node N1.

In some examples, the fourth transistor T4 is a P-type transistor. In a case where the driving sub-circuit 120 forms the path between the second node N2 and the third node N3 to write the data signal at the second node N2 into the third node N3, and the potential of the first scan signal provided by the first scan signal terminal Pgate is a low potential, the path is formed between the first electrode of the fourth transistor T4 (the third node N3) and the second electrode of the fourth transistor T4 (the first node N1), so that the data signal at the third node N3 is written into the first node N1.

As shown in FIG. 8, the storage module 113 is coupled to the first node N1 and the first voltage signal terminal VDD. The storage module 113 is configured to store the potential at the first node N1. The storage module 113 is used for storing the signal transmitted to the first node N1 by the compensation module 112 and maintaining the potential at the first node N1.

In some embodiments, the storage module 113 includes a storage capacitor Cst. A first electrode plate of the storage capacitor Cst is coupled to the first voltage signal terminal VDD, and a second electrode plate of the storage capacitor Cst is coupled to the first node N1. The first electrode plate of the storage capacitor is coupled to the first voltage signal terminal VDD, so that a potential at the first electrode plate of the storage capacitor is stably maintained at the potential of the first voltage signal. The second electrode plate of the storage capacitor is coupled to the first node N1, so that the storage capacitor may store the potential at the first node N1.

As shown in FIG. 10, in some embodiments, the pixel circuit 100 further includes a first light-emitting control sub-circuit 141 and a second light-emitting control sub-circuit 142.

The first light-emitting control sub-circuit 141 is coupled to an enable signal terminal EM, the first voltage signal terminal VDD and the second node N2.

The second light-emitting control sub-circuit 142 is coupled to the enable signal terminal EM, the third node N3 and a fourth node N4.

The first light-emitting control sub-circuit 141 and the second light-emitting control sub-circuit 142 are configured to, under control of an enable signal provided by the enable signal terminal EM, create a path between the first voltage signal terminal VDD and the fourth node N4 in cooperation with the driving sub-circuit 120, so as to drive the light-emitting device to emit light.

The first light-emitting control sub-circuit 141 and the second light-emitting control sub-circuit 142 may be connected in series between the first voltage signal terminal VDD and the light-emitting device together with the driving sub-circuit 120. For example, the first light-emitting control sub-circuit 141 is connected in series between the driving sub-circuit 120 and the first voltage signal terminal VDD, and the second light-emitting control sub-circuit 142 is connected in series between the driving sub-circuit 120 and the light-emitting device.

In a case where the first light-emitting control sub-circuit 141, the second light-emitting control sub-circuit 142 and the driving sub-circuit 120 are each in a working state, the first voltage signal provided by the first voltage signal terminal VDD can be transmitted to the light-emitting device, thereby driving the light-emitting device to emit light. In a case where at least one of the first light-emitting control sub-circuit 141, the second light-emitting control sub-circuit 142 and the driving sub-circuit 120 is in a non-working state, the first voltage signal provided by the first voltage signal terminal VDD cannot be transmitted to the light-emitting device.

In some examples, in a case where the potential of the enable signal provided by the enable signal terminal EM is an effective potential, the first light-emitting control sub-circuit 141 and the second light-emitting control sub-circuit 142 are each in the working state. In a case where the potential of the enable signal provided by the enable signal terminal EM is an ineffective potential, the first light-emitting control sub-circuit 141 and the second light-emitting control sub-circuit 142 are each in the non-working state.

As shown in FIG. 10, in some embodiments, the first light-emitting control sub-circuit 141 includes a fifth transistor T5. A control electrode of the fifth transistor T5 is coupled to the enable signal terminal EM, a first electrode of the fifth transistor T5 is coupled to the first voltage signal terminal VDD, and a second electrode of the fifth transistor T5 is coupled to the second node N2. The fifth transistor T5 is configured to write the first voltage signal provided by the first voltage signal terminal VDD into the second node N2 under control of the enable signal provided by the enable signal terminal EM.

In some embodiments, the second light-emitting control sub-circuit 142 includes a sixth transistor T6. A control electrode of the sixth transistor T6 is coupled to the enable signal terminal EM, a first electrode of the sixth transistor T6 is coupled to the third node N3, and a second electrode of the sixth transistor T6 is coupled to the fourth node N4. The sixth transistor T6 is configured to create a path between the third node N3 and the fourth node N4 under control of the enable signal provided by the enable signal terminal EM.

In the case where the potential of the enable signal provided by the enable signal terminal EM is the effective potential, a path can be formed between the first electrode of the fifth transistor T5 (the first voltage signal terminal VDD) and the second electrode of the fifth transistor T5 (the second node N2), so that the first voltage signal provided by the first voltage signal terminal VDD is written into the second node N2. In addition, the potential at the first node N1 is the effective potential, so that the driving sub-circuit 120 forms the path between the second node N2 and the third node N3, so as to write the first voltage signal at the second node N2 into the third node N3. Moreover, in the case where the potential of the enable signal provided by the enable signal terminal EM is the effective potential, a path can also be formed between the first electrode of the sixth transistor T6 (the third node N3) and the second electrode of the sixth transistor T6 (the fourth node N4), so that the first voltage signal at the third node N3 is written into the fourth node N4. As a result, the light-emitting device is driven to emit light.

In some examples, the fifth transistor T5 and the sixth transistor T6 are both P-type transistors. In a case where the potential of the enable signal provided by the enable signal terminal EM is a low potential, the path can be formed between the first voltage signal terminal VDD and the second node N2, so that the first voltage signal provided by the first voltage signal terminal VDD is written into the second node N2. In addition, the potential at the first node N1 is the effective potential, so that the driving sub-circuit 120 forms the path between the second node N2 and the third node N3, so as to write the first voltage signal at the second node N2 into the third node N3. Moreover, in the case where the potential of the enable signal provided by the enable signal terminal EM is the low potential, the path can also be formed between the third node N3 and the fourth node N4, so that the first voltage signal at the third node N3 is written into the fourth node N4. As a result, the light-emitting device is driven to emit light.

As shown in FIG. 10, in some embodiments, the pixel circuit 100 further includes a first reset sub-circuit 151 and a second reset sub-circuit 152.

The first reset sub-circuit 151 is coupled to a reset signal terminal Preset, a first initialization signal terminal and the first node N1. The first reset sub-circuit 151 is configured to write a first initialization signal provided by the first initialization signal terminal Vinit1 into the first node N1 under control of a reset signal provided by the reset signal terminal Preset.

In some examples, in a case where the potential of the reset signal provided by the reset signal terminal Preset is an effective potential, the first reset sub-circuit 151 writes the first initialization signal provided by the first initialization signal terminal Vinit1 into the first node N1, so as to reset the potential at the first node N1.

In some embodiments, the first reset sub-circuit 151 includes a seventh transistor T7. A control electrode of the seventh transistor T7 is coupled to the reset signal terminal Preset, a first electrode of the seventh transistor T7 is coupled to the first initialization signal terminal, and a second electrode of the seventh transistor T7 is coupled to the first node N1. The seventh transistor T7 is configured to write the first initialization signal provided by the first initialization signal terminal Vinit1 into the first node N1 under the control of the reset signal provided by the reset signal terminal Preset.

In some examples, in the case where the potential of the reset signal provided by the reset signal terminal Preset is the effective potential, a path is formed between the first electrode of the seventh transistor T7 (the first initialization signal terminal) and the second electrode of the seventh transistor T7 (the first node N1), so that the first initialization signal provided by the first initialization signal terminal is written into the first node N1.

In some examples, the seventh transistor T7 is a P-type transistor. In a case where the potential of the reset signal provided by the reset signal terminal Preset is a low potential, the first initialization signal provided by the first initialization signal terminal is written into the first node N1 to reset the potential at the first node N1.

The potential of the first initialization signal may be in a range of −10 V to 0 V, inclusive. For example, the potential of the first initialization signal is −10 V, −8.3 V, −7.2 V, —6.7 V, −5.5 V, −4.9 V, −3.6 V, −2.8 V, −1.4 V, −0.3 V or 0 V.

The second reset sub-circuit 152 is coupled to a second control signal terminal K2, a second initialization signal terminal Vinit2 and the fourth node N4. The second reset sub-circuit 152 is configured to write a second initialization signal provided by the second initialization signal terminal into the fourth node N4 under control of a second control signal provided by the second control signal terminal K2.

In some embodiments, the second control signal terminal K2 may be the reset signal terminal Preset. That is, the reset signal terminal Preset is also used as the second control signal terminal K2, and the second control signal is the reset signal. Alternatively, the second control signal terminal K2 may be the second scan signal terminal Pscan. That is, the second scan signal terminal Pscan is also used as the second control signal terminal K2, and the second control signal is the second scan signal. Of course, in some other embodiments, the second control signal terminal K2 may be an additional signal terminal, which is not limited here.

As shown in FIGS. 12 and 13, in some examples, the reset signal terminal Preset is also used as the second control signal terminal K2. The second reset sub-circuit 152 is coupled to the reset signal terminal Preset, the second initialization signal terminal and the fourth node N4. The second reset sub-circuit 152 is configured to write the second initialization signal provided by the second initialization signal terminal into the fourth node N4 under control of the reset signal provided by the reset signal terminal Preset.

As shown in FIGS. 10 and 11, in some other examples, the second scan signal terminal Pscan is also used as the second control signal terminal K2. The second reset sub-circuit 152 is coupled to the second scan signal terminal Pscan, the second initialization signal terminal and the fourth node N4. The second reset sub-circuit 152 is configured to write the second initialization signal provided by the second initialization signal terminal into the fourth node N4 under control of the second scan signal provided by the second scan signal terminal Pscan.

In some embodiments, the second reset sub-circuit 152 includes an eighth transistor T8. A control electrode of the eighth transistor T8 is coupled to the second control signal terminal K2, a first electrode of the eighth transistor T8 is coupled to the second initialization signal terminal, and a second electrode of the eighth transistor T8 is coupled to the fourth node N4. The eighth transistor T8 is configured to write the second initialization signal provided by the second initialization signal terminal into the fourth node N4 under the control of the second control signal provided by the second control signal terminal K2.

In some examples, in a case where the potential of the second control signal provided by the second control signal terminal K2 is an effective potential, a path is formed between the first electrode of the eighth transistor T8 (the second initialization signal terminal) and the second electrode of the eighth transistor T8 (the fourth node N4), so that the second initialization signal provided by the second initialization signal terminal is written into the fourth node N4 to reset a potential at the fourth node N4.

As shown in FIGS. 12 and 13, in some examples, the reset signal terminal Preset is also used as the second control signal terminal K2. The control electrode of the eighth transistor T8 is coupled to the reset signal terminal Preset, the first electrode of the eighth transistor T8 is coupled to the second initialization signal terminal, and the second electrode of the eighth transistor T8 is coupled to the fourth node N4. In the case where the potential of the reset signal provided by the reset signal terminal Preset is the effective potential, the second initialization signal provided by the second initialization signal terminal is written into the fourth node N4.

For example, the eighth transistor T8 is a P-type transistor. In the case where the potential of the reset signal provided by the reset signal terminal Preset is the low potential, the path is formed between the second initialization signal terminal and the fourth node N4, so that the second initialization signal provided by the second initialization signal terminal is written into the fourth node N4 to reset the potential at the fourth node N4.

As shown in FIGS. 10 and 11, in some examples, the second scan signal terminal Pscan is also used as the second control signal terminal K2. The control electrode of the eighth transistor T8 is coupled to the second scan signal terminal Pscan, the first electrode of the eighth transistor T8 is coupled to the second initialization signal terminal, and the second electrode of the eighth transistor T8 is coupled to the fourth node N4. In a case where a potential of the second scan signal provided by the second scan signal terminal Pscan is an effective potential, the second initialization signal provided by the second initialization signal terminal is written into the fourth node N4.

For example, the eighth transistor T8 is the P-type transistor. In a case where the potential of the second scan signal provided by the second scan signal terminal Pscan is a low potential, the path is formed between the second initialization signal terminal and the fourth node N4, so that the second initialization signal provided by the second initialization signal terminal is written into the fourth node N4 to reset the potential at the fourth node N4.

The potential of the second initialization signal may be in a range of −10 V to 0 V, inclusive. For example, the potential of the second initialization signal is −10 V, −8.3 V, —7.2V, −6.7V, −5.5V, −4.9V, −3.6V, −2.8V, −1.4V, −0.3 V or 0 V.

Figure 14:
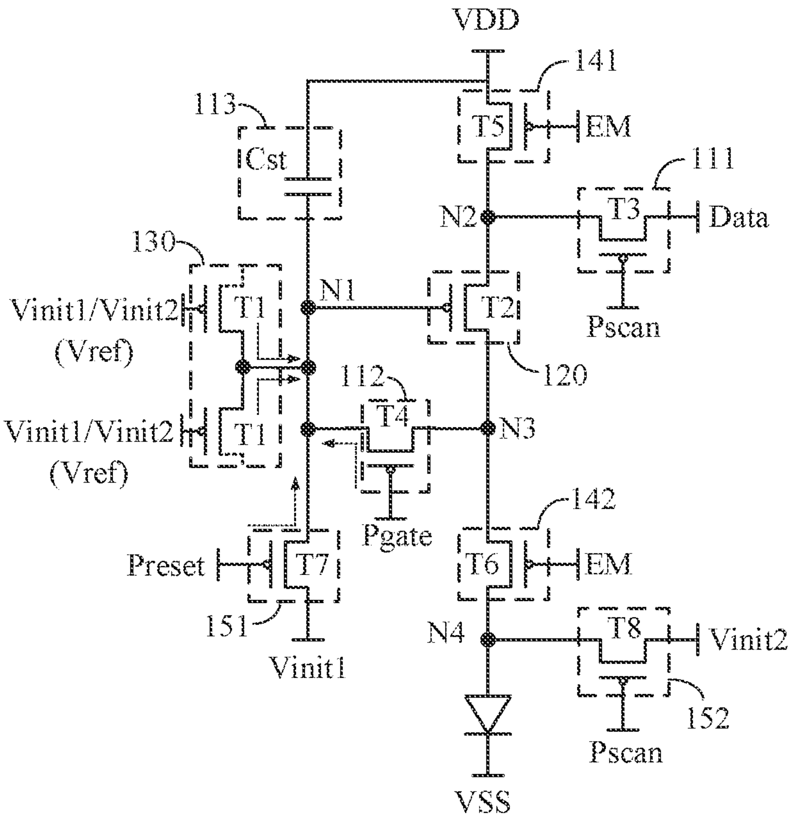
FIG. 14 is a structural diagram of yet another pixel circuit, in accordance with some embodiments.

As shown in FIG. 14, in some embodiments, the first initialization signal terminal Vinit1 is also used as the reference signal terminal Vref to be coupled to at least one potential maintenance sub-circuit 130. That is, in a case where there are a plurality of potential maintenance sub-circuits 130, the first initialization signal terminal Vinit1 may also be used as the reference signal terminal Vref of a single potential maintenance sub-circuit 130; alternatively, the first initialization signal terminal Vinit1 may also be used as reference signal terminals Vref of the plurality of potential maintenance sub-circuits 130.

As shown in FIG. 14, in some embodiments, the second initialization signal terminal Vinit2 is also used as the reference signal terminal Vref to be coupled to at least one potential maintenance sub-circuit 130. That is, in a case where there are the plurality of potential maintenance sub-circuits 130, the second initialization signal terminal Vinit2 may also be used as the reference signal terminal Vref of a single potential maintenance sub-circuit 130; alternatively, the second initialization signal terminal Vinit2 may also be used as reference signal terminals Vref of the plurality of potential maintenance sub-circuits 130.

In the case where there are the plurality of potential maintenance sub-circuits 130, and the first initialization signal terminal Vinit1 and the second initialization signal terminal Vinit2 are each also used as the reference signal terminal Vref, the first initialization signal terminal Vinit1 may also be used as reference signal terminal(s) Vref of a part of the plurality of potential maintenance sub-circuits 130, and the second initialization signal terminal Vinit2 may also be used as reference signal terminal(s) Vref of another part of the plurality of potential maintenance sub-circuits 130. Of course, there may be yet another part of the plurality of potential maintenance sub-circuits 130 coupled to an independent reference signal terminal Vref.

As shown in FIGS. 10 to 17, in some embodiments, the potential maintenance sub-circuit 130 includes first transistor(s) T1. One of a control electrode, a first electrode and a second electrode of the first transistor T1 is coupled to the circuit node, and another of the control electrode, the first electrode and the second electrode of the first transistor T1 is coupled to the reference signal terminal Vref.

Figure 15:
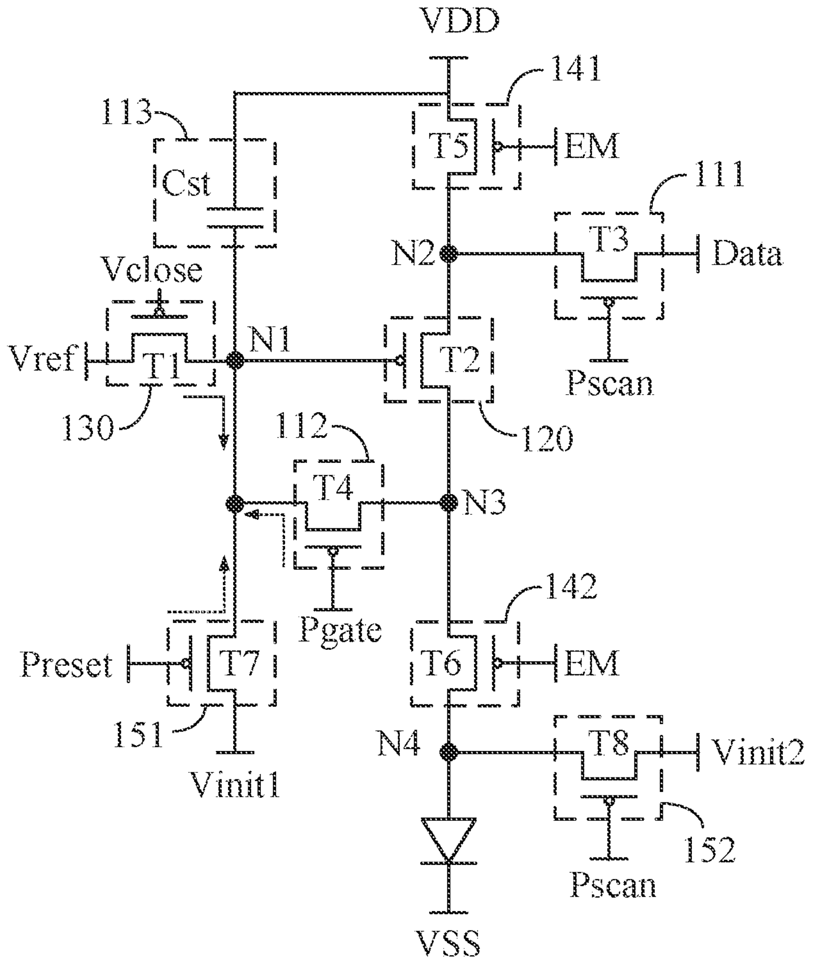
FIG. 15 is a structural diagram of yet another pixel circuit, in accordance with some embodiments.

As shown in FIG. 15, in some examples, the first electrode of the first transistor T1 is coupled to the circuit node, the second electrode of the first transistor T1 is coupled to the reference signal terminal Vref, and the control electrode of the first transistor T1 is coupled to a turn-off signal terminal Vclose. Alternatively, the second electrode of the first transistor T1 is coupled to the circuit node, the first electrode of the first transistor T1 is coupled to the reference signal terminal Vref, and the control electrode of the first transistor T1 is coupled to the turn-off signal terminal Vclose.

The turn-off signal terminal Vclose provides a signal having an ineffective potential, and the signal controls the first transistor T1 to be in the turned-off state. The reference signal provided by the reference signal terminal Vref maintains the potential at the circuit node using the electric leakage compensation path between the first electrode and the second electrode of the first transistor T1.

In some embodiments, the potential maintenance sub-circuit 130 includes the first transistor(s) T1. One of the control electrode and a signal electrode of the first transistor T1 is coupled to the circuit node, and another of the control electrode and the signal electrode of the first transistor T1 is coupled to the reference signal terminal Vref. The signal electrode of the first transistor T1 is the first electrode or the second electrode of the first transistor T1.

As shown in FIGS. 10 and 11, in some examples, the control electrode of the first transistor T1 is coupled to the circuit node, the first electrode of the first transistor T1 is coupled to the reference signal terminal Vref, and the second electrode of the first transistor T1 is not coupled to another signal terminal. Alternatively, the first electrode of the first transistor T1 is coupled to the circuit node, the control electrode of the first transistor T1 is coupled to the reference signal terminal Vref, and the second electrode of the first transistor T1 is not coupled to another signal terminal.

The first transistor T1 is turned off, and the reference signal provided by the reference signal terminal Vref maintains the potential at the circuit node using the electric leakage compensation path between the control electrode and the first electrode of the first transistor T1 (the electric leakage compensation path is indicated by the solid arrow in the drawings).

As shown in FIGS. 12 and 13, in some examples, the control electrode of the first transistor T1 is coupled to the circuit node, the second electrode of the first transistor T1 is coupled to the reference signal terminal Vref, and the first electrode of the first transistor T1 is not coupled to another signal terminal. Alternatively, the second electrode of the first transistor T1 is coupled to the circuit node, the control electrode of the first transistor T1 is coupled to the reference signal terminal Vref, and the first electrode of the first transistor T1 is not coupled to another signal terminal.

The first transistor T1 is turned off, and the reference signal provided by the reference signal terminal Vref maintains the potential at the circuit node using the electric leakage compensation path between the control electrode and the second electrode of the first transistor T1.

In some embodiments, the potential maintenance sub-circuit 130 includes two first transistors T1. Control electrodes of the two first transistors T1 are both coupled to the reference signal terminal Vref, and the same signal electrodes of the two first transistors T1 are both coupled to a same circuit node.

As shown in FIG. 14, in some examples, the potential maintenance sub-circuit 130 includes two first transistors T1. Control electrodes of the two first transistors T1 are both coupled to the reference signal terminal Vref, and the same signal electrodes of the two first transistors T1 are both coupled to the same circuit node.

The two first transistors T1 are both turned off, an electric leakage compensation path exists between the first electrode and the control electrode of one first transistor T1, and another electric leakage compensation path exists between the first electrode and the control electrode of another first transistor T1. The reference signal provided by the reference signal terminal Vref maintains the potential at the circuit node using the two electric leakage compensation paths.

As shown in FIG. 14, in some examples, the potential maintenance sub-circuit 130 includes two first transistors T1. Control electrodes of the two first transistors T1 are both coupled to the reference signal terminal Vref, and second electrodes of the two first transistors T1 are both coupled to the same circuit node.

The two first transistors T1 are both turned off, an electric leakage compensation path exists between the second electrode and the control electrode of one first transistor T1, and another electric leakage compensation path exists between the second electrode and the control electrode of another first transistor T1. The reference signal provided by the reference signal terminal Vref maintains the potential at the circuit node using the two electric leakage compensation paths.

In some embodiments, the potential maintenance sub-circuit 130 includes two first transistors T1. The same signal electrodes of the two first transistors T1 are both coupled to the reference signal terminal Vref, and control electrodes of the two first transistors T1 are both coupled to a same circuit node.

As shown in FIG. 11, in some examples, the potential maintenance sub-circuit 130 includes two first transistors T1, first electrodes of the two first transistors T1 are both coupled to the reference signal terminal Vref, and control electrodes of the two first transistors T1 are both coupled to the same circuit node.

The two first transistors T1 are both turned off, an electric leakage compensation path exists between the first electrode and the control electrode of one first transistor T1, and another electric leakage compensation path exists between the first electrode and the control electrode of another first transistor T1. The reference signal provided by the reference signal terminal Vref maintains the potential at the circuit node using the two electric leakage compensation paths.

As shown in FIG. 13, in some examples, the potential maintenance sub-circuit 130 includes two first transistors T1, second electrodes of the two first transistors T1 are both coupled to the reference signal terminal Vref, and control electrodes of the two first transistors T1 are both coupled to a same circuit node.

The two first transistors T1 are both turned off, an electric leakage compensation path exists between the second electrode and the control electrode of one first transistor T1, and another electric leakage compensation path exists between the second electrode and the control electrode of another first transistor T1. The reference signal provided by the reference signal terminal Vref maintains the potential at the circuit node using the two electric leakage compensation paths.

In some other embodiments, the potential maintenance sub-circuit 130 includes two first transistors T1. The potential maintenance sub-circuit 130 has an electric leakage compensation path between the first electrode and the control electrode of one first transistor T1, and another electric leakage compensation path between the second electrode and the control electrode of another first transistor T1.

In some examples, the potential maintenance sub-circuit 130 includes two first transistors T1. The first electrode of one first transistor T1 is coupled to the reference signal terminal Vref, and the control electrode of the one first transistor T1 is coupled to the circuit node; the second electrode of another first transistor T1 is coupled to the reference signal terminal Vref, and the control electrode of the another first transistor T1 is coupled to the circuit node.

In some embodiments, the potential maintenance sub-circuit 130 is coupled to the first node N1 and the reference signal terminal Vref. In a case where the potential of the first scan signal is the ineffective potential, a difference between the potential at the first node N1 and the potential of the reference signal is approximately equal to a difference between the potential of the first scan signal and the potential at the first node N1.

In some examples, the control electrode of the fourth transistor T4 is coupled to the first scan signal terminal Pgate, and the second electrode of the fourth transistor T4 is coupled to the first node N1. In the case where the potential of the first scan signal provided by the first scan signal terminal Pgate is the ineffective potential, the fourth transistor T4 is turned off, and an electric leakage path exists between the control electrode and the second electrode of the fourth transistor T4, so that the potential of the first scan signal has an influence on the potential at the first node N1.

The control electrode of the first transistor T1 is coupled to the reference signal terminal Vref, and the second electrode of the first transistor T1 is coupled to the first node N1. The first transistor T1 is turned off, and an electric leakage compensation path exists between the control electrode and the second electrode of the first transistor T1. In addition, since the difference between the potential of the reference signal provided by the reference signal terminal Vref and the potential at the first node N1 is approximately equal to the difference between the potential of the first scan signal and the potential at the first node N1, the influence of the first scan signal on the potential at the first node N1 may be alleviated or even eliminated by the reference signal through the electric leakage compensation path. As a result, the potential at the first node N1 is maintained.

For example, the potential at the first node N1 is 3 V, the ineffective potential of the first scan signal is 10 V, and the potential of the reference signal is −4 V. The first scan signal may have an influence of raising the potential at the first node N1 through the electric leakage path, and at the same time, the reference signal may have an influence of lowering the potential at the first node N1 through the electric leakage compensation path, so that the influence of raising the potential at the first node N1 caused by the first scan signal through the electric leakage path may be alleviated or even eliminated. As a result, the potential at the first node N1 is maintained.

As shown in FIG. 10, in some embodiments, the potential maintenance sub-circuit 130 is coupled to the first node N1 and the reference signal terminal Vref. In a case where the potential of the reset signal is the ineffective potential, the difference between the potential at the first node N1 and the potential of the reference signal is approximately equal to a difference between the potential of the reset signal and the potential at the first node N1.

In some examples, the control electrode of the seventh transistor T7 is coupled to the reset signal terminal Preset, and the second electrode of the seventh transistor T7 is coupled to the first node N1. In the case where the potential of the reset signal provided by the reset signal terminal Preset is the ineffective potential, the seventh transistor T7 is turned off, and an electric leakage path exists between the control electrode and the second electrode of the seventh transistor T7, so that the potential of the reset signal has an influence on the potential at the first node N1.

The control electrode of the first transistor T1 is coupled to the reference signal terminal Vref, and the second electrode of the first transistor T1 is coupled to the first node N1. The first transistor T1 is turned off, and an electric leakage compensation path exists between the control electrode and the second electrode of the first transistor T1. In addition, since the difference between the potential of the reference signal provided by the reference signal terminal Vref and the potential at the first node N1 is approximately equal to the difference between the potential of the reset signal and the potential at the first node N1, the influence of the reset signal on the potential at the first node N1 may be alleviated or even eliminated by the reference signal through the electric leakage compensation path. As a result, the potential at the first node N1 is maintained.

For example, the potential at the first node N1 is 3 V, the ineffective potential of the reset signal is 10 V, and the potential of the reference signal is −4 V. The reset signal may have an influence of raising the potential at the first node N1 through the electric leakage path, and at the same time, the reference signal may have an influence of lowering the potential at the first node N1 through the electric leakage compensation path, so that the influence of raising the potential at the first node N1 caused by the reset signal through the electric leakage path may be alleviated or even eliminated. As a result, the potential at the first node N1 is maintained.

In some embodiments, in a case where the number of the electric leakage compensation paths communicated with the circuit node is less than the number of the electric leakage paths communicated with the circuit node, the difference between the potential of the reference signal provided by the reference signal terminal Vref and the potential at the first node N1 may be greater than the difference between the potential of the first scan signal and the potential at the first node N1.

As shown in FIG. 10, in a case where the potential of the reset signal and the potential of the first scan signal are both the ineffective potentials, the difference between the potential at the first node N1 and the potential of the reference signal is approximately equal to a sum of the difference between the potential of the reset signal and the potential at the first node N1 and the difference between the potential of the first scan signal and the potential at the first node N1.

In some examples, the potential of the reset signal and the potential of the first scan signal are both the ineffective potentials, which may be understood as that, the electric leakage path exists between the control electrode and the second electrode of the fourth transistor T4, and the another electric leakage path exists between the control electrode and the second electrode of the seventh transistor T7. That is, the potential of the reset signal and the potential of the first scan signal will have influences on the potential at the first node N1 together.

The electric leakage compensation path exists between the control electrode and the second electrode of the first transistor T1. In addition, since the difference between the potential at the first node N1 and the potential of the reference signal is approximately equal to the sum of the difference between the potential of the reset signal and the potential at the first node N1 and the difference between the potential of the first scan signal and the potential at the first node N1, the influences of the two electric leakage paths (the electric leakage path between the reset signal terminal and the first node N1 and the electric leakage path between the first scan signal terminal and the first node N1) on the potential at the first node N1 may be alleviated or even eliminated by the reference signal through the electric leakage compensation path. As a result, the potential at the first node N1 is maintained.

For example, the potential at the first node N1 is 1 V, the ineffective potentials of the reset signal and the first scan signal are both 5 V, and the potential of the reference signal is −7 V. The reset signal and the first scan signal each have an influence of raising the potential at the first node N1 through a respective electric leakage path, and at the same time, the reference signal may have the influence of lowering the potential at the first node N1 through the electric leakage compensation path, so that the influences of raising the potential at the first node N1 caused by the reset signal and the first scan signal through their respective electric leakage paths may be alleviated or even eliminated. As a result, the potential at the first node N1 is maintained.

In some embodiments, as shown in FIG. 11, the pixel circuit includes two first transistors T1, and an electric leakage compensation path exists between the control electrode and the first electrode of each first transistor T1, so that the pixel circuit has two electric leakage compensation paths for the first node N1.

In the case where the potential of the reset signal and the potential of the first scan signal are both the ineffective potentials, twice the difference between the potential at the first node N1 and the potential of the reference signal is approximately equal to the sum of the difference between the potential of the reset signal and the potential at the first node N1 and the difference between the potential of the first scan signal and the potential at the first node N1.

For example, the potential at the first node N1 is 1 V, the ineffective potentials of the reset signal and the first scan signal are both 5 V, and the potential of the reference signal is −3 V. The reset signal and the first scan signal each have an influence of raising the potential at the first node N1 through a respective electric leakage path, and at the same time, the reference signal may have the influences of lowering the potential at the first node N1 through the two electric leakage compensation paths, so that the influences of raising the potential at the first node N1 caused by the reset signal and the first scan signal through their respective electric leakage path may be alleviated or even eliminated. As a result, the potential at the first node N1 is maintained.

In some embodiments, in a case where the number of the electric leakage compensation paths communicated with the circuit node is more than the number of the electric leakage paths communicated with the circuit node, the difference between the potential of the reference signal provided by the reference signal terminal Vref and the potential at the first node N1 may be less than the difference between the potential of the first scan signal and the potential at the first node N1.

In summary, it may be understood that a product of the difference between the potential of the reference signal and the potential at the circuit node and the number of the electric leakage compensation paths may be approximately equal to a sum of differences each between a potential at an electric leakage source and the potential at the circuit node in all the electric leakage paths that are communicated with the circuit node.

In some examples, as shown in FIG. 10, the potential of the first scan signal is the ineffective potential, such as 10 V. The potential at the first node N1 is 5 V, and the potential of the reference signal is 0 V. The first scan signal may have the influence of raising the potential at the first node N1 through the electric leakage path, and at the same time, the reference signal may have the influence of lowering the potential at the first node N1 through the electric leakage compensation path, so that the influence of raising the potential at the first node N1 caused by the first scan signal through the electric leakage path may be alleviated or even eliminated. As a result, the potential at the first node N1 is maintained.

In some examples, as shown in FIG. 10, the potential of the first scan signal is the ineffective potential, such as 10 V. The potential at the first node N1 is 0 V, and the potential of the reference signal is −10 V. The first scan signal may have the influence of raising the potential at the first node N1 through the electric leakage path, and at the same time, the reference signal may have the influence of lowering the potential at the first node N1 through the electric leakage compensation path, so that the influence of raising the potential at the first node N1 caused by the first scan signal through the electric leakage path may be alleviated or even eliminated. As a result, the potential at the first node N1 is maintained.

In some other embodiments, the potential of the reference signal may be greater than 0 V, such as +3 V or +5 V.

It will be noted that the potential of the reference signal may be adjusted according to actual requirements for an application scenario of the pixel circuit.

Figure 16:
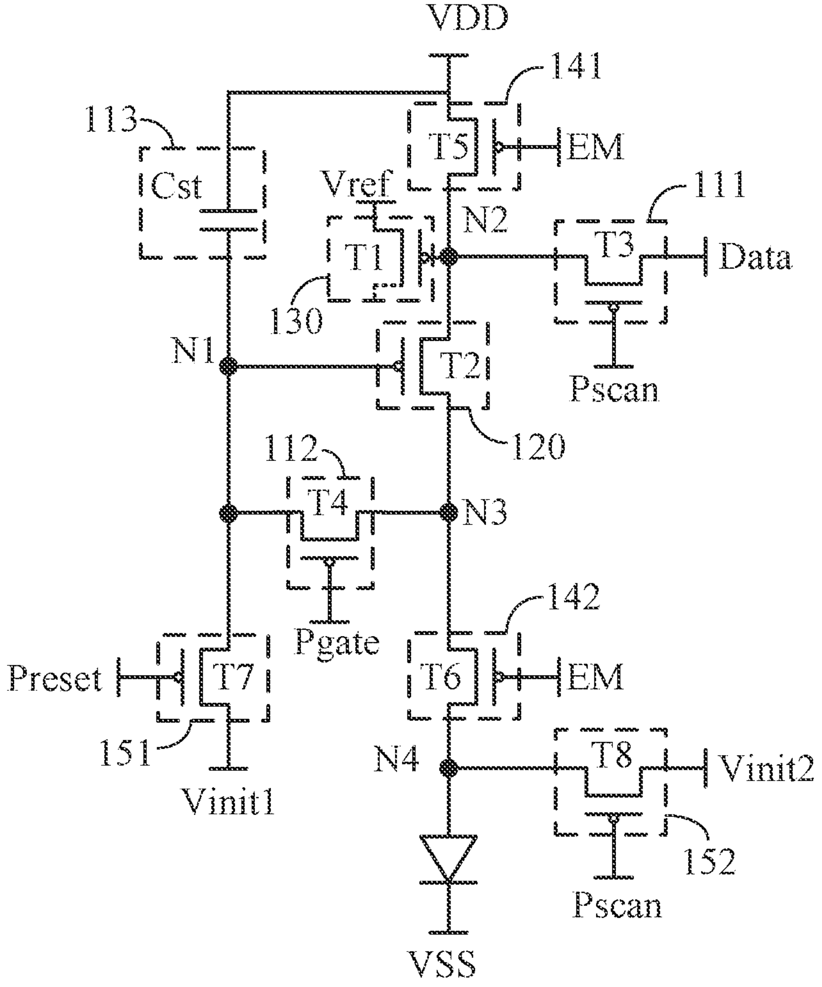
FIG. 16 is a structural diagram of yet another pixel circuit, in accordance with some embodiments.
Figure 17:
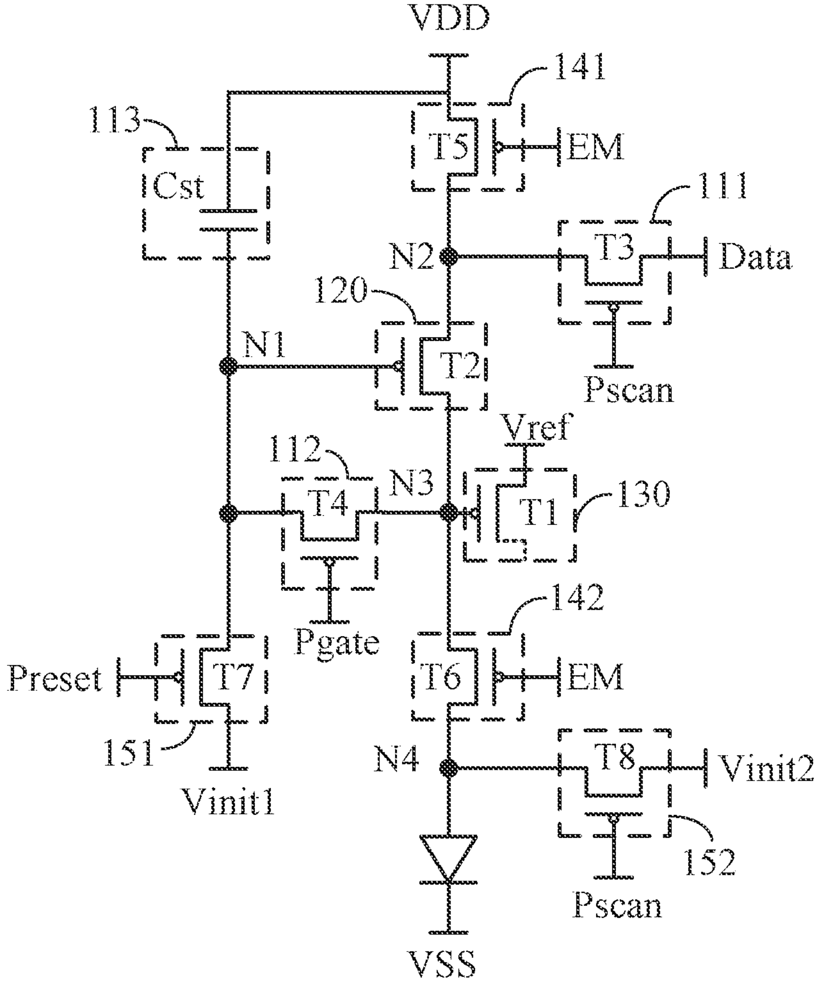
FIG. 17 is a structural diagram of yet another pixel circuit, in accordance with some embodiments.

The above embodiments are described by considering an example where the potential maintenance sub-circuit 130 is coupled to the first node N1, as shown in FIG. 16, the potential maintenance sub-circuit 130 may also be coupled to the second node N2; alternatively, as shown in FIG. 17, the potential maintenance sub-circuit 130 may also be coupled to the third node N3, which is not limited here.

Some embodiments of the present disclosure provide a driving method of a pixel circuit. A display process of the display apparatus is described before the driving method is described.

In the field of display technologies, a frame of image refers to an image "drawn" in a display screen in a row-by-row scanning manner or an interlaced scanning manner. For example, as shown in FIG. 6, the plurality of sub-pixels P included in the display panel 1000 are arranged in an array that include N rows and M columns. In the display process, scan signals are input to sub-pixels P in a first row to sub-pixels P in an N-th row in the row-by-row manner respectively by a first gate line G1 (GL) to an N-th gate line GN (GL), so as to enable the sub-pixels P to be turned on row by row. When sub-pixels P in each row are turned on, data lines DL output respective data signals to all the sub-pixels in the current row of sub-pixels P (including M sub-pixels in total), so that the plurality of sub-pixels P are lit up from the first row to the N-th row to display a corresponding image. In this way, the frame of image may be “drawn” (i.e., the frame of image may be displayed). Next, the plurality of sub-pixels P are lit up from the first row to the N-th row in the row-by-row scanning manner again, so that another corresponding image is displayed. In this way, a next frame of image may be “drawn” (i.e., the next frame of image may be displayed).

Generally, a refresh frequency of the display apparatus may be 60 Hz or 100 Hz. That is, the display apparatus may display 60 frames of images or 100 frames of images in one second, and the display period of each frame of image is 1/60 seconds or 1/100 seconds. Since human eyes have persistence of vision, there may be a case that the human eyes do not feel any change of an image in the display apparatus within one second when a still image is displayed, but actually the image in the display apparatus has been repeatedly displayed 60 or 100 times. When the refresh frequency of the display apparatus is high enough, the human eyes will not feel flickering caused by image switching.

In addition, the refresh frequency of some wearable display apparatuses may be a low refresh frequency, such as 1 Hz. That is, the display apparatus may display one frame of image in one second, and the display period of each frame of image is one second or even longer.

Figure 18:
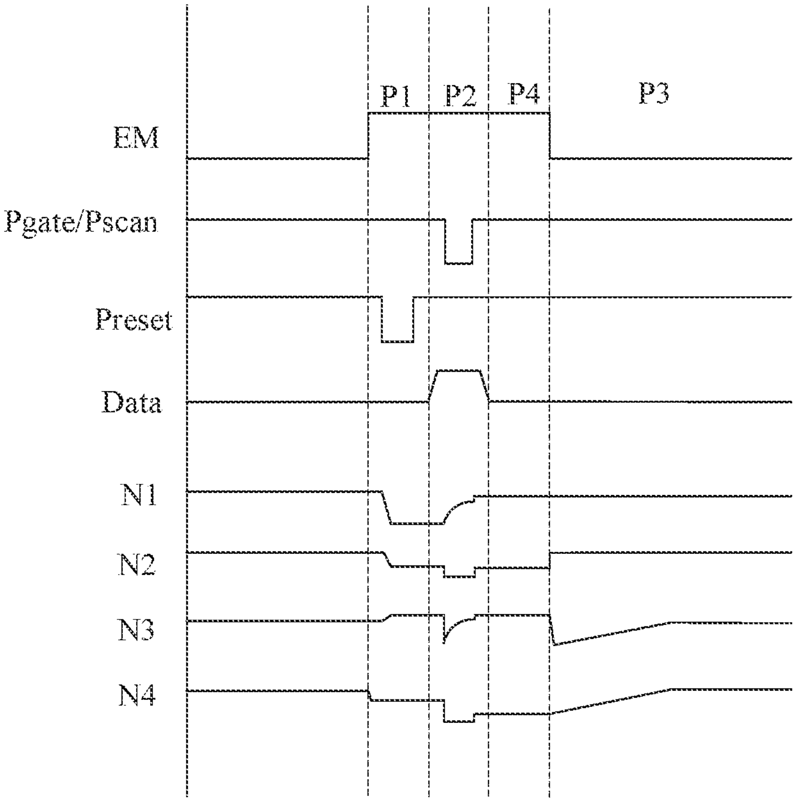
FIG. 18 is a timing diagram of another pixel circuit, in accordance with some embodiments.

Based on this, with reference to FIG. 18, in some embodiments, a frame of display period includes a writing phase P2 and a light-emitting phase P3.

As shown in FIG. 18, in the writing phase P2, the following process will be included.

The potential of the first scan signal provided by the first scan signal terminal Pgate, the potential of the second scan signal provided by the second scan signal terminal Pscan, and the potential of the data signal provided by the data signal terminal Data are all the effective potentials; and the potential of the enable signal provided by the enable signal terminal EM is the ineffective potential. In addition, the potential of the first voltage signal provided by the first voltage signal terminal VDD is a high potential, and the potential of the second voltage signal provided by the second voltage signal terminal is a low potential.

The data writing sub-circuit 110 is in the working state in a case of receiving the first scan signal that is at the effective potential, so as to write the data signal provided by the data signal terminal Data into the first node N1. Therefore, in the writing phase P2, the potential at the first node N1 is gradually raised until the potential at the first node N1 controls the driving sub-circuit 120 to switch to the non-working state, and the potential at the first node N1 no longer rises. In this case, the potential at the first node N1 is (Vdata+Vth).

In some examples, as shown in FIG. 8, the data writing sub-circuit 110 includes the third transistor T3, the fourth transistor T4 and the storage capacitor, and the driving sub-circuit 120 includes the second transistor T2.

Considering an example in which the second transistor T2, the third transistor T3 and the fourth transistor T4 are all P-type transistors, referring to the timing in FIG. 18, the potential of the first scan signal provided by the first scan signal terminal Pgate and the potential of the second scan signal provided by the second scan signal terminal Pscan are both low potentials, and the potential of the data signal provided by the data signal terminal Data and the potential of the enable signal provided by the enable signal terminal EM are both high potentials. In addition, the potential of the first voltage signal provided by the first voltage signal terminal VDD is a high potential, and the potential of the second voltage signal provided by the second voltage signal terminal is the low potential.

The third transistor T3 is turned on to write the data signal provided by the data signal terminal Data into the second node N2. The second transistor T2 is turned on to write the data signal at the second node N2 into the third node N3. The fourth transistor T4 is turned on to write the data signal at the third node N3 into the first node N1. In the above process, the potential at the first node N1 is gradually raised until the second transistor T2 is in the turned-off state, and the potential at the first node N1 no longer rises. In this case, the potential at the first node N1 is (Vdata+Vth).

As shown in FIG. 18, in the light-emitting phase P3, the following process will be included.

The potential of the first scan signal provided by the first scan signal terminal Pgate, the potential of the second scan signal provided by the second scan signal terminal Pscan and the potential of the data signal provided by the data signal terminal Data are all the ineffective potentials; and the potential of the enable signal provided by the enable signal terminal EM is the effective potential. In addition, the potential of the first voltage signal provided by the first voltage signal terminal VDD is the high potential, and the potential of the second voltage signal provided by the second voltage signal terminal is the low potential.

The driving sub-circuit 120 is in the working state under the control of the potential at the first node N1 to write the first voltage signal provided by the first voltage signal terminal VDD into the third node N3, so as to drive the light-emitting device to emit light.

In some examples, as shown in FIG. 8, the driving sub-circuit 120 includes the second transistor T2.

Considering an example in which the second transistor T2 is a P-type transistor, referring to the timing in FIG. 18, the potential of the first scan signal provided by the first scan signal terminal Pgate and the potential of the second scan signal provided by the second scan signal terminal Pscan are both low potentials; and the potential of the data signal provided by the data signal terminal Data and the potential of the enable signal provided by the enable signal terminal EM are both high potentials. In addition, the potential of the first voltage signal provided by the first voltage signal terminal VDD is the high potential, and the potential of the second voltage signal provided by the second voltage signal terminal is the low potential.

The potential at the first electrode of the second transistor T2 is instantly converted from the potential Vdata of the data signal to the potential of the first voltage signal, so that the second transistor T2 is in the turned-on state to transmit the first voltage signal at the second node N2 to the third node N3. As a result, the light-emitting device is driven to emit light.

The potential maintenance sub-circuit 130 is coupled to the first node N1 and the reference signal terminal Vref, and the first node N1 is coupled to the data writing sub-circuit 110. In the light-emitting phase P3, the data writing sub-circuit 110 is in the non-working state, and an electric leakage path that is communicated with the first node N1 exists.

The potential maintenance sub-circuit 130 has an electric leakage compensation path inside, an end of the electric leakage compensation path is communicated with the reference signal terminal Vref, and another end of the electric leakage compensation path is communicated with the first node N1. In this way, the reference signal terminal Vref may alleviate or even eliminate the influence of the electric leakage path in the data writing sub-circuit 110 on the potential at the first node N1 using the electric leakage compensation path. As a result, the potential at the first node N1 is maintained.

In some embodiments, as shown in FIG. 11, the pixel circuit includes the data writing sub-circuit 110, the driving sub-circuit 120, the potential maintenance sub-circuit 130, the first light-emitting control sub-circuit 141, the second light-emitting control sub-circuit 142, the first reset sub-circuit 151 and the second reset sub-circuit 152.

The potential maintenance sub-circuit 130 includes two first transistors T1. The driving sub-circuit 120 includes the second transistor T2. The data writing sub-circuit 110 includes the third transistor T3, the fourth transistor T4 and the storage capacitor. The first light-emitting control sub-circuit 141 includes the fifth transistor T5, and the second light-emitting control sub-circuit 142 includes the sixth transistor T6. The first reset sub-circuit 151 includes the seventh transistor T7, and the second reset sub-circuit 152 includes the eighth transistor T8.

A control electrode of the first transistor T1 is coupled to the first node N1, a second electrode of the first transistor T1 is coupled to the reference signal terminal Vref, and a first electrode of the first transistor T1 is not coupled to a signal terminal.

A control electrode of the second transistor T2 is coupled to the first node N1, a first electrode of the second transistor T2 is coupled to the second node N2, and a second electrode of the second transistor T2 is coupled to the third node N3.

A control electrode of the third transistor T3 is coupled to the second scan signal terminal Pscan, a first electrode of the third transistor T3 is coupled to the data signal terminal Data, and a second electrode of the third transistor T3 is coupled to the second node N2.

A control electrode of the fourth transistor T4 is coupled to the first scan signal terminal Pgate, a first electrode of the fourth transistor T4 is coupled to the third node N3, and a second electrode of the fourth transistor T4 is coupled to the first node N1.

A control electrode of the fifth transistor T5 is coupled to the enable signal terminal EM, a first electrode of the fifth transistor T5 is coupled to the first voltage signal terminal VDD, and a second electrode of the fifth transistor T5 is coupled to the second node N2.

A control electrode of the sixth transistor T6 is coupled to the enable signal terminal EM, a first electrode of the sixth transistor T6 is coupled to the third node N3, and a second electrode of the sixth transistor T6 is coupled to the fourth node N4.

A control electrode of the seventh transistor T7 is coupled to the reset signal terminal Preset, a first electrode of the seventh transistor T7 is coupled to the first initialization signal terminal, and a second electrode of the seventh transistor T7 is coupled to the first node N1.

A control electrode of the eighth transistor T8 is coupled to the second scan signal terminal Pscan, a first electrode of the eighth transistor T8 is coupled to the second initialization signal terminal, and a second electrode of the eighth transistor T8 is coupled to the fourth node N4.

Considering an example in which the above transistors are all P-type transistors, as shown in FIG. 18, which is a working timing diagram of the pixel circuit, the timing of the first scan signal, the timing of the second scan signal, the timing of the reset signal, the timing of the enable signal, the timing of the data signal, the timing of the first node N1, the timing of the second node N2, the timing of the third node N3 and the timing of the fourth node N4 are included in FIG. 18. In addition, the first voltage signal terminal VDD continuously provides the high-potential first voltage signal (e.g., the potential of the first voltage signal is VGH), and the second voltage signal terminal continuously provides the low-potential second voltage signal (e.g., the potential of the second voltage signal is VGL).

In some embodiments, the driving method of the pixel circuit includes a reset phase P1, the writing phase P2 and the light-emitting phase P3 in a frame of display period.

In the reset phase P1, the following process will be included.

The potential of the reset signal provided by the reset signal terminal Preset is a low potential; the potential of the first scan signal provided by the first scan signal terminal Pgate, the potential of the second scan signal provided by the second scan signal terminal Pscan, the potential of the enable signal provided by the enable signal terminal EM and the potential of the data signal provided by the data signal terminal Data are all high potentials.

The seventh transistor T7 is turned on to write the first initialization signal provided by the first initialization signal terminal into the first node N1, so as to remove the potential at the first node N1 in a previous frame and prepare for writing a data signal into the first node N1 subsequently.

In the writing phase P2, the following process will be included.

The potential of the first scan signal provided by the first scan signal terminal Pgate and the potential of the second scan signal provided by the second scan signal terminal Pscan are both low potentials; and the potential of the data signal provided by the data signal terminal Data, the potential of the reset signal provided by the reset signal terminal Preset and the potential of the enable signal provided by the enable signal terminal EM are all high potentials.

When the reset phase finishes, the potential at the first node N1 is the potential of the first initialization signal, and the second transistor T2 is turned on. At the same time, the third transistor T3 and the fourth transistor T4 are turned on, so that the data signal is transmitted to the first node N1 through the third transistor T3, the second transistor T2 and the fourth transistor T4. In the writing phase P2, the potential at the first node N1 is gradually raised until the potential at the first node N1 controls the second transistor T2 to be in the turned-off state. In this case, the potential at the first node N1 no longer rises, and the potential at the first node N1 is ((Vdata+Vth), where Vth may be a threshold voltage of the second transistor T2, the second transistor T2 being the driving transistor).

In addition, the eighth transistor T8 is in the turned-on state to write the second initialization signal provided by the second initialization signal terminal into the fourth node N4. That is, the potential of the second initialization signal is written into the anode of the light-emitting device, so that the light-emitting device is no longer in a positive conductive state. As a result, the light-emitting device stops emitting light.

In the light-emitting phase P3, the following process will be included.

The potential of the enable signal provided by the enable signal terminal EM and the potential of the data signal provided by the data signal terminal Data are both low potentials; and the potential of the reset signal provided by the reset signal terminal Preset, the potential of the first scan signal provided by the first scan signal terminal Pgate and the potential of the second scan signal provided by the second scan signal terminal Pscan are all high potentials.

The fifth transistor T5 and the sixth transistor T6 are turned on to write the first voltage signal provided by the first voltage signal terminal VDD into the second node N2. The potential at the first electrode of the second transistor T2 is instantly converted from the potential Vdata of the data signal to the potential of the first voltage signal, so that the second transistor T2 is in the turned-on state to transmit the first voltage signal at the second node N2 to the fourth node N4 through the second transistor T2 and the sixth transistor T6. That is, the potential of the first voltage signal is written into the anode of the light-emitting device, so that the light-emitting device is in the positive conductive state. As a result, the light-emitting device is driven to emit light.

In this case, a driving current for driving the light-emitting device to emit light may refer to a formula:

$$Id = \frac{1}{2} \times \mu \times Cox \times \frac{W}{L} \times (Vgs - Vth)^2 = \frac{k}{2}(Vdata - VDD)^2.$$

Where Id is the driving current; Vgs is a voltage difference between the control electrode and the first electrode of the second transistor T2, and Vgs may be equal to the potential at the control electrode of the second transistor T2 minusing the potential of the first voltage signal (i.e., Vdata+Vth−VDD); Vth is the threshold voltage of the second transistor T2; p is an electron mobility of the second transistor T2; W is a channel width of the second transistor T2; L is a channel length of the second transistor T2; Cox is a gate oxide capacitance per unit area; k is (p×Cox×W/L), and k of a single transistor may be understood as a fixed coefficient.

It can be seen from the formula that the driving current is only related to the potential of the data signal and the potential of the first voltage signal.

In the reset phase P1, the writing phase P2 and the light-emitting phase P3, the first transistor T1 is always in the turned-off state.

Considering the light-emitting phase P3 as an example, the fourth transistor T4 and the seventh transistor T7 are both in the turned-off state. The electric leakage path between the control electrode and the second electrode of the fourth transistor T4 is communicated with the first node N1 and the first scan signal terminal Pgate. In this case, the potential at the first node N1 is raised by the high-potential first scan signal. The electric leakage path between the control electrode and the second electrode of the seventh transistor T7 is communicated with the first node N1 and the reset signal terminal Preset. In this case, the potential at the first node N1 is raised by the high-potential reset signal. That is, in the light-emitting phase P3, there are two electric leakage paths that have influences on the potential at the first node N1.

The electric leakage compensation path between the control electrode and the second electrode of the first transistor T1 is communicated with the first node N1 and the reference signal terminal Vref. The potential of the reference signal may be lower than the potential at the first node N1. For example, the potential Vref of the reference signal is equal to (VN1−|VGH−VN1|) (i.e., Vref=VN1−|VGH−VN1|). The potential at the first node N1 is lowered by the reference signal through two electric leakage compensation paths, so that the influences of raising the potential at the first node N1 by the two electric leakage paths may be alleviated or even eliminated. As a result, the potential at the first node N1 is maintained.

The number of the electric leakage compensation paths and the number of the electric leakage paths may be equal or unequal. In the case where the number of the electric leakage compensation paths is equal to the number of the electric leakage paths, it has a good effect on maintaining the potential at the first node N1.

In some embodiments, as shown in FIG. 18, a maintaining phase P4 is further included between the writing phase P2 and the light-emitting phase P3.

In the maintaining phase, the potential of the first scan signal provided by the first scan signal terminal Pgate, the potential of the second scan signal provided by the second scan signal terminal Pscan, the potential of the reset signal provided by the reset signal terminal Preset, and the potential of the enable signal provided by the enable signal terminal EM are all high potentials; and the potential of the data signal provided by the data signal terminal Data is a low potential.

The second transistor T2 maintains the turned-off state when the reset phase finishes, the eighth transistor T8 and the sixth transistor T6 are both in the turned-off state, the fourth node N4 maintains the second initialization signal, so that the light-emitting device does not emit light.

Some embodiments of the present disclosure provide a display panel. As shown in FIG. 6, the display panel includes the base substrate, and a plurality of data lines DL, a plurality of gate lines GL, and a plurality of pixel regions defined by the plurality of data lines DL and the plurality of gate lines GL. The plurality of data lines DL, the plurality of gate lines GL, and the plurality of pixel regions are disposed on the base substrate. Each pixel region includes a pixel circuit 100 as described in any of the embodiments. The pixel circuit 100 includes at least the first transistor T1, the second transistor T2, the third transistor T3, the fourth transistor T4, the fifth transistor T5, the sixth transistor T6, the seventh transistor T7, the eighth transistor T8 and the storage capacitor Cst.

The following description will be made by considering an example in which the pixel circuit 100 is the pixel circuit as shown in FIG. 11, but it should not be limited thereto.

The base substrate 200 may be a flexible base substrate or a rigid base substrate. The rigid base substrate may include glass or quartz. The flexible base substrate may include polyethylene terephthalate (PET), polyimide (PI) or cycloolefin polymer (COP).

Each gate line GL extends along the first direction, and the plurality of gate lines GL are arranged at intervals along the second direction. Each data line DL extends along the second direction, and the plurality of data lines DL are arranged at intervals along the first direction. Thus, the plurality of pixel regions are defined on the base substrate 200.

For example, the first direction X is perpendicular to the second direction Y, so that the plurality of data lines DL and the plurality of gate lines GL define a plurality of rectangular pixel regions.

As shown in FIGS. 19 to 23, in some embodiments, the display panel includes a semiconductor layer 210, a first conductive layer 220, a second conductive layer 230, a third conductive layer 240, and a fourth conductive layer 250 that are disposed in a direction away from the base substrate 200.

The semiconductor layer 210 may include a low temperature polycrystalline silicon (LTPS) material, or may include another suitable material, which is not limited here.

Figure 19:
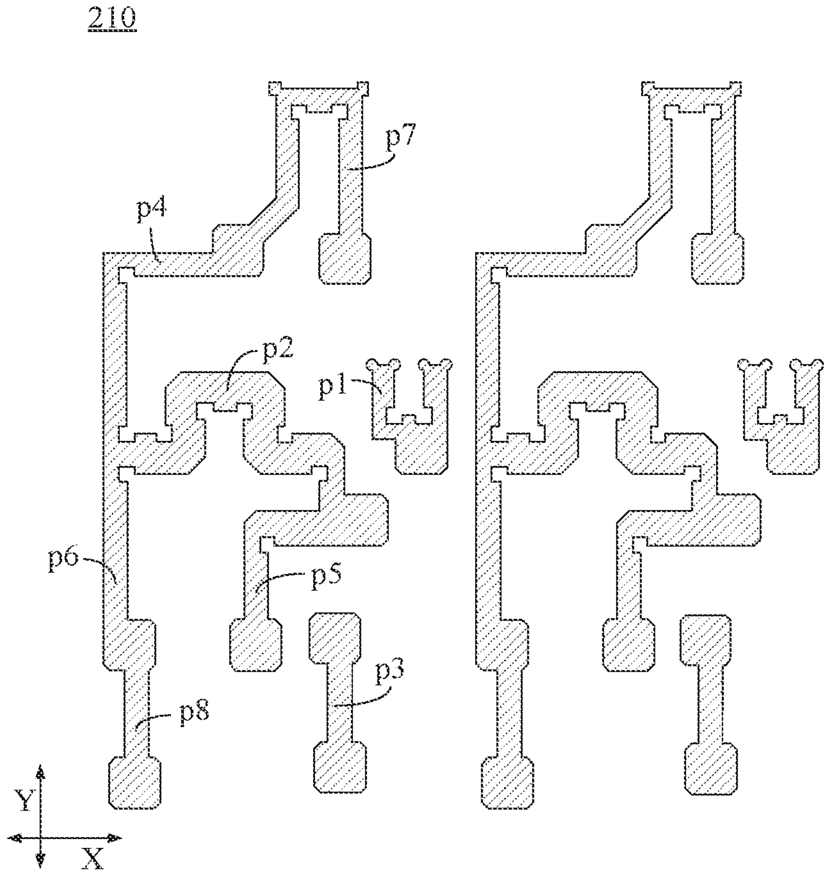
FIG. 19 is a partial structural diagram of a semiconductor layer in a display panel, in accordance with some embodiments.

As shown in FIG. 19, the semiconductor layer 210 may include active layers of all the transistors in the pixel circuit. Considering an example in which the pixel circuit includes the first transistor T1 to the eighth transistor T8, the semiconductor layer 210 may include active layers (p1 to p8) of the first transistor T1 to the eighth transistor T8.

In some examples, the active layer p1 of the first transistor T1 is an active layer that is independently arranged. An active layer p3 of the third transistor T3 is also an active layer that is independently arranged. An active layer p2 of the second transistor T2, an active layer p4 of the fourth transistor T4, to the active layer p8 of the eighth transistor T8 are of a one-piece structure.

In some examples, portions of the semiconductor layer 210 in different pixel circuits are disposed apart from each other.

The first conductive layer 220, the second conductive layer 230, the third conductive layer 240 and the fourth conductive layer 250 may each include a metal material, an alloy material, or another conductive material. The metal material is, for example, aluminum (Al), copper (Cu), silver (Ag), magnesium (Mg), ytterbium (Yb) or lithium (Li).

In some embodiments, a first insulating layer may be included between the semiconductor layer 210 and the first conductive layer 220. A material of the first insulating layer may be one or a combination of an oxide, a nitride, and an oxynitride, which is not limited here.

Figure 20:
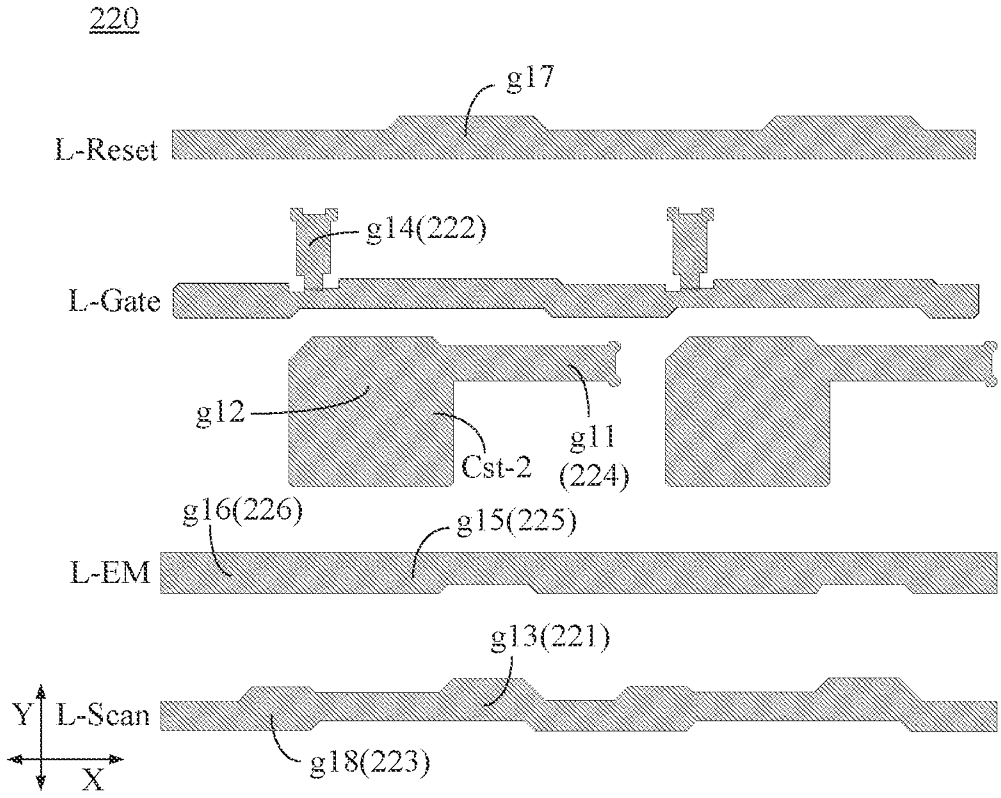
FIG. 20 is a partial structural diagram of a first conductive layer in a display panel, in accordance with some embodiments.

As shown in FIG. 20, the first conductive layer 220 may include first scan signal lines L-Gate and control electrodes (g11 to g18) of the first transistor T1 to the eighth transistor T8. The first scan signal line and the control electrode g14 of the fourth transistor T4 may be of a one-piece structure.

In some examples, in a case where the display panel further includes reset signal lines L-Reset, second scan signal lines L-Scan, the storage capacitors Cst, and enable signal lines L-EM, the first conductive layer 220 may further include the reset signal lines L-Reset, the second scan signal lines L-Scan, second electrode plates Cst-2 of the storage capacitors Cst and the enable signal lines L-EM. The first scan signal lines L-Gate, the reset signal lines L-Reset, the second scan signal lines L-Scan and the enable signal lines L-EM extend substantially in a direction parallel to the first direction X, and are arranged at interval in the second direction Y.

The enable signal line L-EM may be located between the first scan signal line L-Gate and the second scan signal line L-Scan; the reset signal line L-Reset may be located on a side of the first scan signal line L-Gate away from the second scan signal line L-Scan.

In some examples, the second electrode plate Cst-2 of the storage capacitor Cst and a control electrode g12 of the second transistor T2 may be of a one-piece structure. It can be understood that the control electrode g12 of the second transistor T2 is also used as the second electrode plate Cst-2 of the storage capacitor Cst.

In some examples, the control electrode g17 of the seventh transistor T7 and the reset signal line L-Reset may be of a one-piece structure. It can be understood that a portion of the reset signal line L-Reset is also used as the control electrode of the seventh transistor T7.

In some examples, the control electrode g15 of the fifth transistor T5 and the enable signal line L-EM may be of a one-piece structure. It can be understood that a portion of the enable signal line L-EM is also used as a control electrode of the fifth transistor T5.

In some embodiments, the first conductive layer 220 includes a first conductive pattern 221 and a second conductive pattern 222 that are arranged separated from each other. The first conductive pattern 221 is used as the control electrode g13 of the third transistor T3, and the first conductive pattern 221 and the second scan signal line L-Scan are of a one-piece structure. It can be understood that a portion of the second scan signal line L-Scan is also used as the control electrode g13 of the third transistor T3. The second conductive pattern 222 is used as the control electrode g14 of the fourth transistor T4, and the second conductive pattern 222 and the first scan signal line L-Gate are of a one-piece structure.

In some embodiments, the first conductive layer 220 includes the first conductive pattern 221 and a third conductive pattern 223. The first conductive pattern 221 is used as the control electrode g13 of the third transistor T3, and the third conductive pattern 223 is used as the control electrode g18 of the eighth transistor T8.

In some examples, the control electrode g13 of the third transistor T3, the control electrode g18 of the eighth transistor T8 and the second scan signal line L-Scan may be of a one-piece structure. It can be understood that a portion of the second scan signal line L-Scan is also used as the control electrode g13 of the third transistor T3, and another portion of the second scan signal line L-Scan is also used as the control electrode g18 of the eighth transistor T8.

In some embodiments, the first conductive layer 220 further includes the second electrode plate Cst-2 of the storage capacitor and a fourth conductive pattern 224. The second electrode plate Cst-2 is also used as the control electrode g12 of the second transistor T2, and the fourth conductive pattern 224 is used as the control electrode g11 of the first transistor T1.

As shown in FIG. 20, in some examples, the fourth conductive pattern 224 extends along the first direction X. The fourth conductive pattern 224 and the second electrode plate Cst-2 of the storage capacitor may be of a one-piece structure.

In some embodiments, the first conductive layer 220 further includes a fifth conductive pattern 225 and a sixth conductive pattern 226. The fifth conductive pattern 225 is used as the control electrode g15 of the fifth transistor T5, and the sixth conductive pattern 226 is used as the control electrode g16 of the sixth transistor T6.

In some examples, the control electrode g15 of the fifth transistor T5, the control electrode g16 of the sixth transistor T6, and the enable signal line L-EM may be of a one-piece structure. It can be understood that a portion of the enable signal line L-EM is also used as the control electrode g15 of the fifth transistor T5, and another portion of the enable signal line L-EM is also used as the control electrode g16 of the sixth transistor T6.

In some embodiments, a second insulating layer may be included between the first conductive layer 220 and the second conductive layer 230. A material of the second insulating layer may be similar to the material of the first insulating layer, which is not repeated here.

Figure 21:
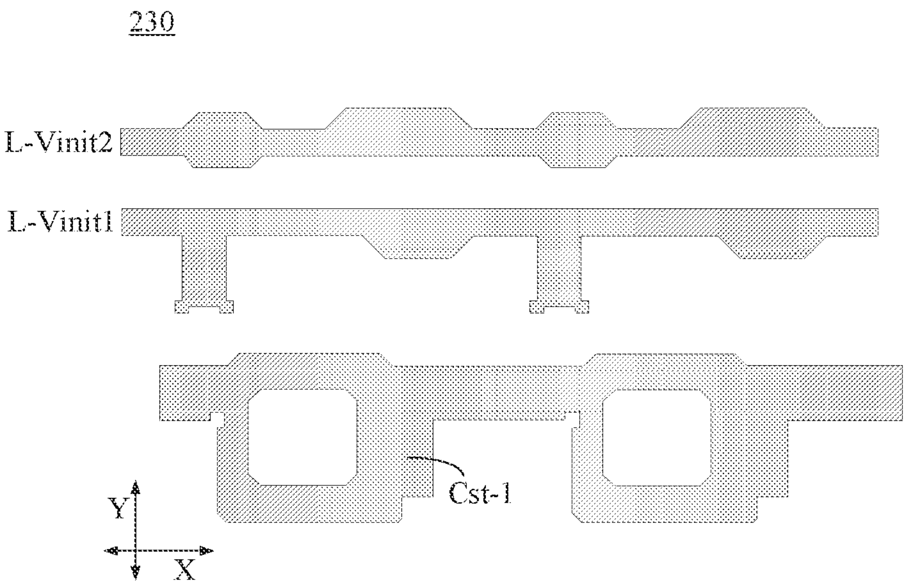
FIG. 21 is a partial structural diagram of a second conductive layer in a display panel, in accordance with some embodiments.

As shown in FIG. 21, in some embodiments, the second conductive layer 230 may include a first electrode plate Cst-1 of the storage capacitor Cst.

In some examples, in a case where the display panel further includes a first initialization signal line L-Vinit1 and a second initialization signal line L-Vinit2, the second conductive layer 230 may further include the first initialization signal line L-Vinit1 and the second initialization signal line L-Vinit2. The first initialization signal line L-Vinit1 and the second initialization signal line L-Vinit2 extend substantially in a direction parallel to the first direction X, and are arranged at intervals in the second direction Y.

The first electrode plate Cst-1 of the storage capacitor Cst is located on a side of the first initialization signal line L-Vinit1 away from the second initialization signal line L-Vinit2.

In some embodiments, a third insulating layer may be included between the second conductive layer 230 and the third conductive layer 240. The third insulating layer may be an interlayer dielectric (ILD) layer. A material of the third insulating layer may be similar to the material of the first insulating layer, which is not repeated here.

Figure 22:
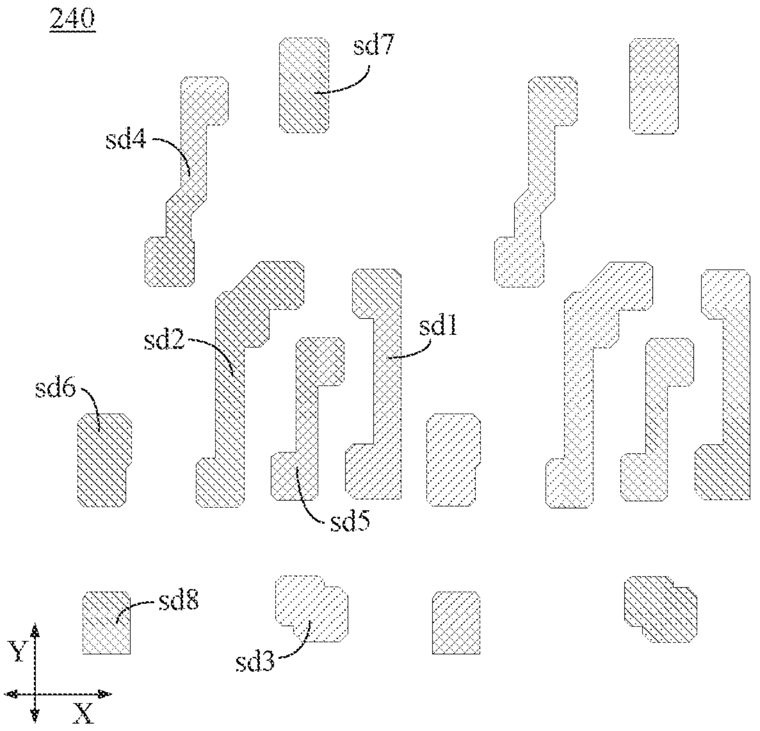
FIG. 22 is a partial structural diagram of a third conductive layer in a display panel, in accordance with some embodiments.

As shown in FIG. 22, in some embodiments, the third conductive layer 240 may include some transition members (a transition member sd1 to a transition member sd8). The transition members (the transition member sd1 to the transition member sd8) may include a source-drain metal layer of at least one of the first transistor T1 to the eighth transistor T8. For example, the transition members (the transition member sd1 to the transition member sd8) may be used as source-drain metal layers of part of the transistors, and portions of the semiconductor layer 210 may be used as source-drain metal layers of another part of the transistors.

In some embodiments, a fourth insulating layer may be included between the third conductive layer 240 and the fourth conductive layer 250. The fourth insulating layer may include a passivation layer (PVX) and a planarization layer (PLN) that are stacked. The passivation layer covers the third conductive layer 240, and the planarization layer covers the passivation layer and provides a flat surface for the fourth conductive layer 250. The passivation layer may be an inorganic insulating layer, and the planarization layer may be an organic insulating layer.

Figure 23:
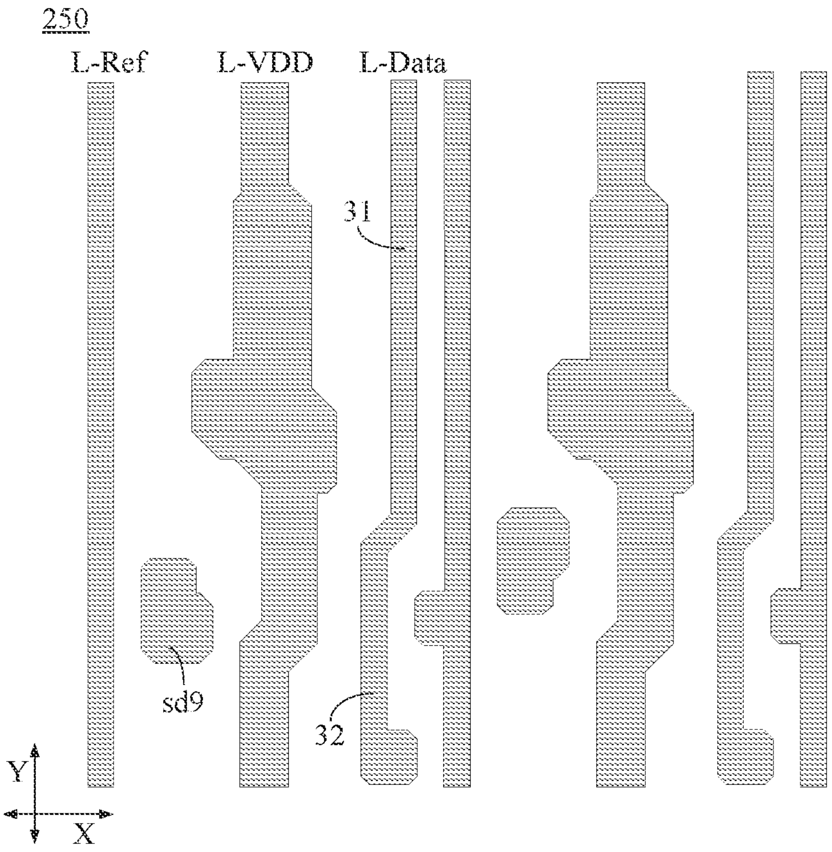
FIG. 23 is a partial structural diagram of a fourth conductive layer in a display panel, in accordance with some embodiments.

As shown in FIG. 23, the fourth conductive layer 250 may include first voltage signal lines L-VDD, the data lines L-Data (i.e., DL), and reference signal lines L-Ref. The first voltage signal lines L-VDD, the Data lines L-Data, and the reference signal lines L-Ref extend substantially in a direction parallel to the second direction Y, and are arranged at intervals in the first direction X. The first voltage signal line L-VDD may be located between the data line L-Data and the reference signal line L-Ref.

As shown in FIG. 23, the data line L-Data may include first main body portions 31 and second main body portions 32. The first main body portion 31 extends along the second direction Y. An end of the second main body portion 32 is bent along the first direction X from the first main body portion 31 and continues to extend along the second direction Y to a certain length, and another end of the second main body portion 32 is bent along the first direction X to be coupled to the first main body portion 31. The first main body portions 31 and the second main body portions 32 of the data line L-Data connected to pixel circuits in a same column may be alternately arranged in the second direction Y.

Figure 24:
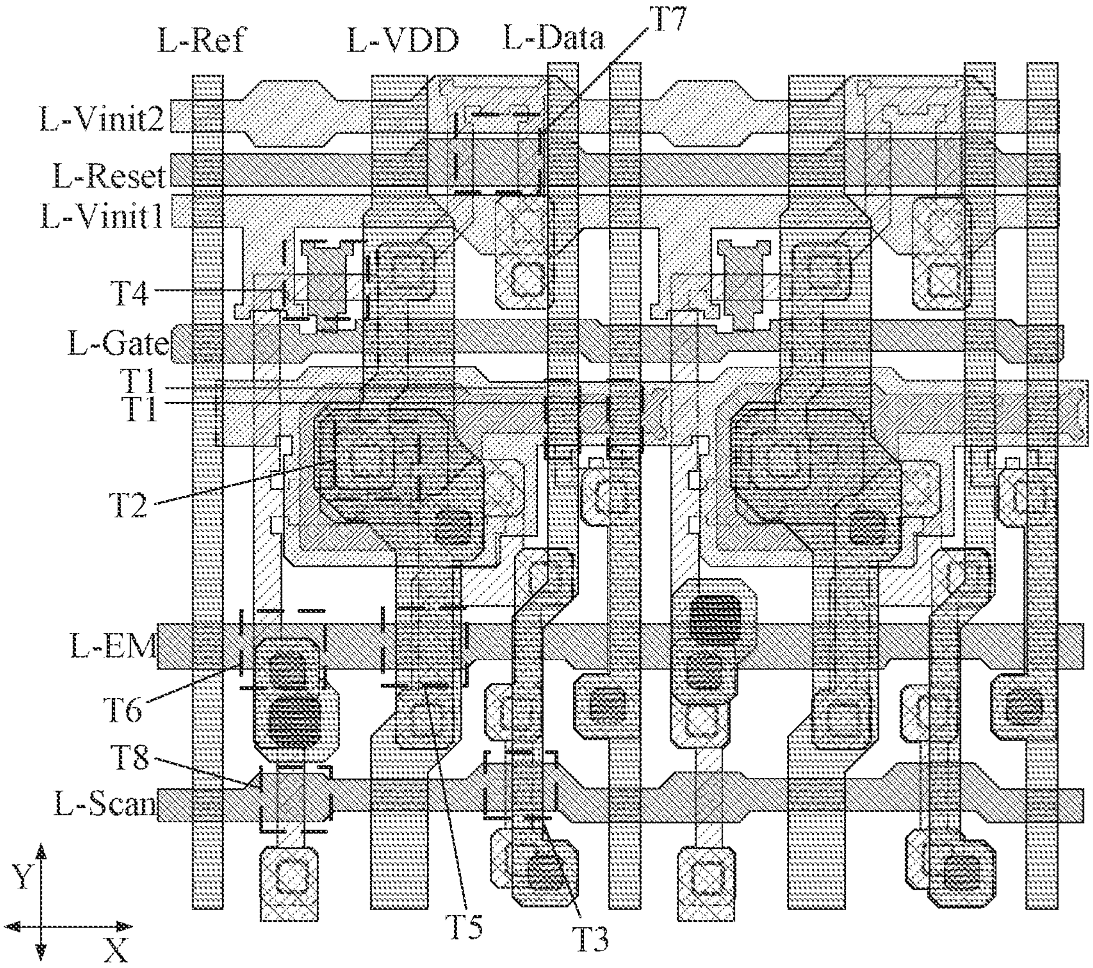
FIG. 24 is a structural diagram of a pixel circuit in a display panel, in accordance with some embodiments.

In combination with FIGS. 23 and 24, in some examples, the pixel circuit 100 includes two first transistors T1. The same signal electrodes (e.g., the first electrodes or the second electrodes) of the two first transistors T1 are coupled to the reference signal terminal Vref, and control electrodes of the two first transistors T1 are coupled to the first node N1.

In this case, an orthographic projection of the reference signal line L-Ref on the base substrate at least partially overlaps with an orthographic projection of a control electrode of a first transistor T1 in the two first transistors T1 on the base substrate. An orthographic projection of the first main body portion 31 on the base substrate at least partially overlaps with an orthographic projection of a control electrode of another first transistor T1 in the two first transistors T1 on the base substrate.

In some embodiments, an orthographic projection of the second main body portion 32 on the base substrate may also at least partially overlap with an orthographic projection of the control electrode of the third transistor T3 on the base substrate.

As shown in FIG. 24, in some embodiments, the pixel circuits in the same column are connected to a single reference signal line L-Ref, a single data line L-Data and a single first voltage signal line L-VDD. In the first direction X, the reference signal line L-Ref and the first voltage signal line L-VDD are located at two sides of the data line L-Data.

As shown in FIG. 23, the fourth conductive layer 250 may further include some transition members (a transition member sd9).

In combination with FIGS. 22, 23 and 24, in some examples, the third conductive layer 240 may include the first transition member sd1 to the eighth transition member sd8, and the fourth conductive layer 250 may include the ninth transition member sd9.

The first transition member sd1 may be connected to the first transistor T1 and the reference signal line L-Ref.

The second transition member sd2 may be connected to the first electrode of the fifth transistor T5 and the first electrode plate of the storage capacitor Cst, and the second transition member sd2 may be connected to the first voltage signal line L-VDD to receive the first voltage signal.

The third transition member sd3 may be connected to the data line L-Data and the first electrode of the third transistor T3, so that the third transistor T3 receives the data signal.

The fourth transition member sd4 may be connected to the second electrode of the fourth transistor T4 and the control electrode g12 of the second transistor T2.

The fifth transition member sd5 may be connected to the first electrode of the second transistor T2 and the second electrode of the third transistor T3.

The sixth transition member sd6 may be connected to the second electrode of the sixth transistor T6 and the ninth transition member sd9, and the ninth transition member sd9 may be connected to the anode of the light-emitting device.

The seventh transition member sd7 may be connected to the first electrode of the seventh transistor T7 and the first initialization signal line L-Vinit1.

The eighth transition member sd8 may be connected to the first electrode of the eighth transistor T8 and the second initialization signal line L-Vinit2.

As shown in FIG. 24, positions of the transistors (the first transistor T1 to the eighth transistor T8) and the storage capacitor Cst in the pixel circuit 100 in the display panel and the signal lines can be seen.

In some examples, in a plane parallel to the base substrate 200, the first transistor T1 may be located between the third transistor T3 and the first scan signal line L-Gate.

In some examples, in the plane parallel to the base substrate 200, the first transistor T1 may be located on a side of the reference signal line L-Ref proximate to the second transistor T2.

In some examples, in the plane parallel to the base substrate 200, the first transistor T1 may be located between the second scan signal line L-Scan and the second initialization signal line L-Vinit2.

In summary, in the display panel provided in the embodiments of the present disclosure, by adding a device structure of the one or more potential maintenance sub-circuits in the display panel, it is possible to improve the stability of the potential at the at least one circuit node, so as to improve the stability of the conductive degree of the at least one transistor in the pixel circuit of the display panel. As a result, the light-emitting device may emit light stably, thereby improving the display performance of the display apparatus.

The foregoing descriptions are merely specific implementation manners of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A pixel circuit, comprising:

a data writing sub-circuit coupled to at least a first voltage signal terminal, a data signal terminal, a first scan signal terminal and a first node; the data writing sub-circuit being configured to write a data signal provided by the data signal terminal into the first node under control of at least a first scan signal provided by the first scan signal terminal;

a driving sub-circuit coupled to the first node, a second node and a third node; the driving sub-circuit being configured to create a path between the second node and the third node under control of a potential at the first node; and one or more potential maintenance sub-circuits; a potential maintenance sub-circuit being coupled to a circuit node and a reference signal terminal, and the potential maintenance sub-circuit being configured to maintain a potential at the circuit node through a reference signal provided by the reference signal terminal, wherein the circuit node is any of the first node, the second node and the third node;

wherein the potential maintenance sub-circuit includes at least one first transistor;

one of a control electrode and a signal electrode of a first transistor is coupled to the circuit node; and another of the control electrode and the signal electrode of the first transistor is coupled to the reference signal terminal, wherein the signal electrode of the first transistor is a first electrode or a second electrode of the first transistor.

2. The pixel circuit according to claim 1, wherein the potential maintenance sub-circuit includes two first transistors;

control electrodes of the two first transistors are both coupled to the reference signal terminal, and same signal electrodes of the two first transistors are coupled to a same circuit node; or the same signal electrodes of the two first transistors are coupled to the reference signal terminal, and the control electrodes of the two first transistors are both coupled to the same circuit node.

3. The pixel circuit according to claim 1, wherein the potential maintenance sub-circuit is coupled to the first node and the reference signal terminal;

in a case where a potential of the first scan signal is an ineffective potential, a difference between the potential at the first node and a potential of the reference signal is approximately equal to a difference between the potential of the first scan signal and the potential at the first node.

4. The pixel circuit according to claim 1, wherein the data writing sub-circuit is further coupled to a first control signal terminal, and the data writing sub-circuit includes:

a data writing module coupled to the first control signal terminal, the data signal terminal and the second node; the data writing module being configured to write the data signal provided by the data signal terminal into the second node under control of a first control signal provided by the first control signal terminal;

a compensation module coupled to the first scan signal terminal, the third node and the first node; the compensation module being configured to, in a case where the driving sub-circuit writes the data signal at the second node into the third node and under control of the first scan signal provided by the first scan signal terminal, write the data signal at the third node into the first node; and a storage module coupled to the first node and the first voltage signal terminal; the storage module being configured to store the potential at the first node.

5. The pixel circuit according to claim 4, wherein the data writing module includes a third transistor; a control electrode of the third transistor is coupled to the first control signal terminal, a first electrode of the third transistor is coupled to the data signal terminal, and a second electrode of the third transistor is coupled to the second node; and the third transistor is configured to write the data signal provided by the data signal terminal into the second node under the control of the first control signal provided by the first control signal terminal; and/or the compensation module includes a fourth transistor; a control electrode of the fourth transistor is coupled to the first scan signal terminal, a first electrode of the fourth transistor is coupled to the third node, and a second electrode of the fourth transistor is coupled to the first node; and the fourth transistor is configured to, in the case where the driving sub-circuit writes the data signal at the second node into the third node and under the control of the first scan signal provided by the first scan signal terminal, write the data signal at the third node into the first node; and/or the storage module includes a storage capacitor; a first electrode plate of the storage capacitor is coupled to the first voltage signal terminal, and a second electrode plate of the storage capacitor is coupled to the first node; and the storage capacitor is configured to store the potential at the first node.

6. The pixel circuit according to claim 4, wherein the first scan signal terminal is also used as the first control signal terminal, and the first control signal is the first scan signal.

7. The pixel circuit according to claim 1, further comprising:

a first light-emitting control sub-circuit coupled to an enable signal terminal, the first voltage signal terminal and the second node; and a second light-emitting control sub-circuit coupled to the enable signal terminal, the third node and a fourth node, wherein the first light-emitting control sub-circuit and the second light-emitting control sub-circuit are configured to, under control of an enable signal provided by the enable signal terminal, create a path between the first voltage signal terminal and the fourth node in cooperation with the driving sub-circuit.

8. The pixel circuit according to claim 7, further comprising:

a first reset sub-circuit coupled to a reset signal terminal, a first initialization signal terminal and the first node; the first reset sub-circuit being configured to write a first initialization signal provided by the first initialization signal terminal into the first node under control of a reset signal provided by the reset signal terminal; and a second reset sub-circuit coupled to a second scan signal terminal, a second initialization signal terminal and the fourth node; the second reset sub-circuit being configured to write a second initialization signal provided by the second initialization signal terminal into the fourth node under control of a second scan signal provided by the second scan signal terminal.

9. The pixel circuit according to claim 7, further comprising:

a first reset sub-circuit coupled to a reset signal terminal, a first initialization signal terminal and the first node; the first reset sub-circuit being configured to write a first initialization signal provided by the first initialization signal terminal into the first node under control of a reset signal provided by the reset signal terminal; and a second reset sub-circuit coupled to a second control signal terminal, a second initialization signal terminal and the fourth node; the second reset sub-circuit being configured to write a second initialization signal provided by the second initialization signal terminal into the fourth node under control of a second control signal provided by the second control signal terminal, wherein the potential maintenance sub-circuit is coupled to the first node and the reference signal terminal;

in a case where a potential of the reset signal is an ineffective potential, a difference between the potential at the first node and a potential of the reference signal is approximately equal to a difference between a potential of the reset signal and the potential at the first node; or in a case where the potential of the reset signal and a potential of the first scan signal are both ineffective potentials, the difference between the potential at the first node and the potential of the reference signal is approximately equal to a sum of the difference between the potential of the reset signal and the potential at the first node and a difference between the potential of the first scan signal and the potential at the first node.

10. The pixel circuit according to claim 9, wherein the reset signal terminal is also used as the second control signal terminal, and the second control signal is the reset signal.

11. The pixel circuit according to claim 9, wherein the first initialization signal terminal is also used as the reference signal terminal and is coupled to at least one of the one or more potential maintenance sub-circuits; and/or the second initialization signal terminal is also used as the reference signal terminal and is coupled to at least one of the one or more potential maintenance sub-circuits.

12. A display panel, comprising:

a base substrate; and a plurality of data lines, a plurality of gate lines, and a plurality of pixel regions defined by the plurality of data lines and the plurality of gate lines; the plurality of data lines, the plurality of gate lines, and the plurality of pixel regions are disposed on the base substrate, wherein each pixel region includes the pixel circuit according to claim 1, and the pixel circuit includes at least one first transistor, a second transistor, a third transistor, a fourth transistor, a fifth transistor, a sixth transistor, a seventh transistor, an eighth transistor and a storage capacitor.

13. The display panel according to claim 12, wherein the display panel comprises:

a semiconductor layer, a first conductive layer, a second conductive layer, a third conductive layer and a fourth conductive layer that are sequentially arranged in a direction away from the base substrate, wherein the semiconductor layer includes active layers of all the transistors in the pixel circuit;

the first conductive layer includes first scan signal lines, second scan signal lines, enable signal lines, and control electrodes of the plurality of transistors; and the first scan signal lines, the second scan signal lines and the enable signal lines extend along a first direction.

14. The display panel according to claim 13, wherein the first conductive layer includes a first conductive pattern and a second conductive pattern; the first conductive pattern is used as a control electrode of the third transistor, and the first conductive pattern and a second scan signal line are of a one-piece structure; the second conductive pattern is used as a control electrode of the fourth transistor, and the second conductive pattern and a first scan signal line are of a one-piece structure; and/or the first conductive layer includes the first conductive pattern and a third conductive pattern; the first conductive pattern is used as the control electrode of the third transistor, and the third conductive pattern is used as a control electrode of the eighth transistor; the first conductive pattern, the third conductive pattern, and a second scan signal line are of a one-piece structure; and/or the first conductive layer further includes a second electrode plate of the storage capacitor and a fourth conductive pattern; the second electrode plate is also used as a control electrode of the second transistor; the fourth conductive pattern is used as a control electrode of a first transistor in the at least one first transistor; the fourth conductive pattern extends along the first direction; and the fourth conductive pattern and the second electrode plate are of a one-piece structure; and/or the first conductive layer further includes a fifth conductive pattern and a sixth conductive pattern; the fifth conductive pattern is used as a control electrode of the fifth transistor; the sixth conductive pattern is used as a control electrode of the sixth transistor; and the fifth conductive pattern, the sixth conductive pattern and an enable signal line are of a one-piece structure.

15. The display panel according to claim 13, wherein the fourth conductive layer includes first voltage signal lines, the data lines and reference signal lines; the first voltage signal lines, the data lines and the reference signal lines extend along a second direction, the first direction and the second direction intersects each other;

an orthographic projection of a first voltage signal line on the base substrate at least partially overlaps with each of orthographic projections of a control electrode of the second transistor and a control electrode of the fifth transistor on the base substrate.

16. The display panel according to claim 15, wherein the pixel circuit includes two first transistors, same signal electrodes of the two first transistors are coupled to the reference signal terminal, and control electrodes of the two first transistors are coupled to the first node;

an orthographic projection of a reference signal line on the base substrate at least partially overlaps with an orthographic projection of a control electrode of a first transistor in the two first transistors on the base substrate;

a data line includes first main body portions and second main body portions each extend along the second direction; a portion of a second main body portion is bent along the first direction and is coupled to a first main body portion; an orthographic projection of the first main body portion on the base substrate at least partially overlaps with an orthographic projection of a control electrode of another first transistor in the two first transistors on the base substrate; and an orthographic projection of the second main body portion on the base substrate at least partially overlaps with an orthographic projection of a control electrode of the third transistor on the base substrate;

the reference signal line and the first voltage signal line that are connected to a same column of pixel circuits are located on two sides of the data line connected to the same column of pixel circuits, respectively.

17. A display apparatus, comprising the display panel according to claim 12.

18. The pixel circuit according to claim 1, wherein the data writing sub-circuit is further coupled to a second scan signal terminal, and the data writing sub-circuit includes:

a data writing module coupled to the second scan signal terminal, the data signal terminal and the second node; the data writing module being configured to write the data signal provided by the data signal terminal into the second node under control of a second scan signal provided by the second scan signal terminal;

a compensation module coupled to the first scan signal terminal, the third node and the first node; the compensation module being configured to, in a case where the driving sub-circuit writes the data signal at the second node into the third node and under control of the first scan signal provided by the first scan signal terminal, write the data signal at the third node into the first node; and a storage module coupled to the first node and the first voltage signal terminal; the storage module being configured to store the potential at the first node.

19. A driving method of a pixel circuit, the pixel circuit including:

a data writing sub-circuit coupled to at least a first voltage signal terminal, a data signal terminal, a first scan signal terminal and a first node; the data writing sub-circuit being configured to write a data signal provided by the data signal terminal into the first node under control of at least a first scan signal provided by the first scan signal terminal;

a driving sub-circuit coupled to the first node, a second node and a third node; the driving sub-circuit being configured to create a path between the second node and the third node under control of a potential at the first node; and one or more potential maintenance sub-circuits; a potential maintenance sub-circuit being coupled to a circuit node and a reference signal terminal, and the potential maintenance sub-circuit being configured to maintain a potential at the circuit node through a reference signal provided by the reference signal terminal, wherein the circuit node is any of the first node, the second node and the third node;

a frame of display period including at least a writing phase and a light-emitting phase, the driving method comprising:

in the writing phase, the data writing sub-circuit writing the data signal into the first node;

in the light-emitting phase, the second node being communicated with the first voltage signal terminal, and the driving sub-circuit forming the path between the second node and the third node, so as to drive a light-emitting device communicated with the third node to emit light; and in a case where the potential maintenance sub-circuit is coupled to the first node, at least in the light-emitting phase, the potential maintenance sub-circuit maintaining the potential at the first node through the reference signal provided by the reference signal terminal;

wherein the potential maintenance sub-circuit includes at least one first transistor;

one of a control electrode and a signal electrode of a first transistor is coupled to the circuit node; and another of the control electrode and the signal electrode of the first transistor is coupled to the reference signal terminal, wherein the signal electrode of the first transistor is a first electrode or a second electrode of the first transistor.

* * * * *